United States Patent
Asada et al.

(10) Patent No.: US 7,731,279 B2
(45) Date of Patent: Jun. 8, 2010

(54) RAPID COOLING AND HEATING OF CAR SEATS WITH MASSAGING EFFECTS

(75) Inventors: H. Harry Asada, Lincoln, MA (US); Manas C. Menon, Boston, MA (US)

(73) Assignees: Massachusetts Institute of Technology, Cambridge, MA (US); Kolon Glotech, Inc. (KR)

( * ) Notice: Subject to any disclaimer, the term of this patent is extended or adjusted under 35 U.S.C. 154(b) by 493 days.

(21) Appl. No.: 11/557,779

(22) Filed: Nov. 8, 2006

(65) Prior Publication Data

US 2007/0084220 A1   Apr. 19, 2007

Related U.S. Application Data

(63) Continuation-in-part of application No. 11/116,002, filed on Apr. 27, 2005, now abandoned.

(60) Provisional application No. 60/819,083, filed on Jul. 7, 2006, provisional application No. 60/565,894, filed on Apr. 28, 2004.

(51) Int. Cl.
*A47C 7/72* (2006.01)
*F25B 21/02* (2006.01)

(52) U.S. Cl. .................. 297/180.12; 62/3.61; 62/3.7; 62/3.2

(58) Field of Classification Search ............. 297/284.1, 297/463.1, 180.1, 180.12; 62/3.61, 3.7, 3.2; 601/86, 90, 91, 98
See application file for complete search history.

(56) References Cited

U.S. PATENT DOCUMENTS 5,924,766 A   7/1999   Esaki et al.

FOREIGN PATENT DOCUMENTS

| DE | 19503291 | 8/1996 |
|---|---|---|
| DE | 10211383 | 10/2003 |
| EP | 0290398 | 11/1988 |
| WO | WO2005105516 | 11/2005 |

OTHER PUBLICATIONS

Reynaerts, Dominiek, et al., "Design Aspects of Shape Memory Actuators," Mechatronics 8 (1998), pp. 635-656.

(Continued)

*Primary Examiner*—Milton Nelson, Jr.
(74) *Attorney, Agent, or Firm*—Mills & Onello, LLP

(57) ABSTRACT

An apparatus and method for providing controlled heating, cooling and motion, in a device such as an active robotic automobile seat, are disclosed. A shape memory alloy (SMA) element, which changes shape upon application of a temperature change to the SMA element, is coupled to a thermoelectric device. Heat flows through the TED upon application of an electrical current through the TED. The apparatus is operable in one of a plurality of modes. In a first mode, a current is applied through the TED to cause a temperature change in the SMA element to change the shape of the SMA element. In a second mode, a current is applied to the TED to cause heat flow in a space adjacent to the apparatus. By controlling application of current to the TED, controlled motion, heating and cooling are achieved in the seat.

79 Claims, 26 Drawing Sheets

OTHER PUBLICATIONS

Mascaro, Stephen, et al., "Design and Control of Vast DOF Wet SMA Array Actuators," Proceedings of the 2003 IEEE/RSJ, International Conference on Intelligent Robots and Systems, Las Vegas, Nevada, Oct. 2003, pp. 1992-1997.

Info-Sheet No. 4, "Selected Properties of NiTi-based Alloys," Memory-Metalle GmbH, http://www.memory-metalle.de/html/03_knowhow/PDF/MM_04_properties_e.pdf.

Rediniotis, Othon K., et al., "Fuel-Powered Compact SMA Actuator," Smart Structures and Materials 2002: Industrial and Commercial Applications of Smart Structures Technologies, Proceedings of SPIE vol. 4698 (2002), pp. 441-453.

Shahin, Ali R., et al., "Enhanced Cooling of Shape Memory Alloy Wires Using Semiconductor"Heat Pump" Modules," Journal of Intelligent Material Systems and Structures, vol. 5, Jan. 1994, pp. 95-104.

Amerigon, Inc., "Climate Control Seats", <http://www.amerigon.com/ccs_works.php>, 2009.

Hunter, I. W., et al., "A Comparison of Muscle with Artificial Actuators", Proceedings of the 1992 IEEE Solid-State Sensor and Actuator Workshop, pp. 178-185.

Madden, J. D. W., et al., "Conducting Polymer Actuators as Engineering Materials", Smart Structures and Materials 2002: Electroactive Polymer Actuators and Devices (EAPAD), Proceedings of SPIE vol. 4695, pp. 176-190 (2002).

Hunter, I. W., et al., "Fast Reversible NiTi Fibers for Use in MicroRobotics", MicroElectro Mechanical Systems, 1991, MEMS 1991, Proceedings of MicroStructures, Sensors, Actuators, Machines and Robots, IEEE, pp. 166-170.

Howe, Robert D., et al., "Shape Memory Alloy Actuator Controller Design for Tactile Displays", Proceedings of 1995 IEEE 34th Conference on Decision & Control, New Orleans, LA, Dec. 1995, pp. 3540-3544.

Mascaro, Stephen A. And H. Harry Asada, "Wet Shape Memory Alloy Actuators for Active Vasculated Robotic Flesh", Proceedings of the 2003 IEEE International Conference on Robotics and Automation, Sep. 2003, Taipei, Taiwan, pp. 282-287.

Mukherjee, Ranjan et al., "An Actuation System for the Control of Multiple Shape Memory Alloy Actuators", Sensors and Actuators A 55 (1996), pp. 185-192.

Cho, Kyu-Jin, et al., "System Architecture and Control of Vast DOF Array Actuators," Proceedings of International Mechanical Engineering Congress & Exposition, Washington, DC, Nov. 16-21, 2003.

Reswick, J.B., et al. "Experience at Rancho Los Amigos Hospital with Devices and Techniques to Prevent Pressure Sores." Bedsore Biomechanics: Proceedings of a Seminar on Tissue Viability and Clinical Applications; organised in association with the Department of Biomedical Engineering, the Institute of Orthopaedics (University of London), Royal National Orthopaedic Hospital, Stanmore, London, and held at the University of Strathclyde, Glasgow, in Aug. 1975. Baltimore: University Park P, 1976. pp. 301-310.

RAPID COOLING AND HEATING OF CAR SEATS WITH MASSAGING EFFECTS

RELATED APPLICATION

This application is based on U.S. provisional application Ser. No. 60/819,083, filed on Jul. 7, 2006 and is a continuation-in-part of U.S. application Ser. No. 11/116,002, filed on Apr. 27, 2005, which is based on U.S. provisional application Ser. No. 60/565,894, filed on Apr. 28, 2004, the contents of which are incorporated herein in their entirety by reference.

BACKGROUND OF THE INVENTION

Long hours of driving cause the driver's tissue at the thighs and hips to be pressurized for an extended period and result in considerable discomfort and driver fatigue. Capillary blood vessels may collapse under a pressure higher than 30 mmHg thereby interfering with blood perfusion and circulation when the driver is seated for a long time. Furthermore, continuous contact with the seat surface often causes heat and moisture accumulation at the contact surface. Periodically stimulating the tissue in contact with the car seat, as well as providing adequate ventilation and pressure relief may alleviate these problems. Automotive manufacturers are enhancing the value of luxury cars by adding more functionality to the car seats.

These car seats are instrumental in providing a relaxed and comfortable driving experience, especially during long trips. Heated car seats are available in many cars, and systems that have cooling as well as heating of the seat surface have also been developed. Embedding a massage function in car seats is another new feature that is gaining popularity.

A driver who is driving for an extended period of time can be fatigued due to inadequate blood perfusion at the tissue under persistent pressure. Stimulation of the tissue as well as pressure relief and ventilation, are desirable. This can reduce the fatigue of the driver, thereby reducing the risk of accidents caused by driver's fatigue. This can generally be accomplished by massage. However, the massage effect should not interfere with driving and, therefore, conventional massage is not generally applicable to driving an automobile.

There are three types of active car seats providing massage effects. One is a vibrating and kneading massage cushion for car seats. These are built with simple DC motors with eccentric weights in order to create vibration. Due to the nature of the DC motor, the frequency of the vibration is high, creating a rapid vibratory motion. But these fast vibrations could cause itchiness and other discomfort when applied for a long time.

Therapeutic massage chairs similar to home-use massagers have been applied to back seats and passenger side seats. These may interfere with driving, and are therefore not applicable to driver car seats. Bulky motors and mechanisms also make them unfavorable for car seat applications.

There is another type of massage car seat that uses air inflation to create bumps on the surface of the seat. The bumps created by air inflation are limited to a simple round shape. They are effective for redistributing pressure, but no sophisticated motion can be created.

SUMMARY OF THE INVENTION

The present invention is directed to an apparatus that includes a thermally innervated material actuator, the thermally innervated material actuator changing shape upon application of a temperature change to the thermally innervated material actuator. The apparatus further includes a bilayer of thermoelectric devices (TED) having first and second TEDs coupled to the thermally innervated material actuator such that the thermally innervated material actuator is between the first and second TEDs. The first and second TEDs apply the temperature change to the thermally innervated material actuator.

In one embodiment, the first and second TEDs are peltier effect thermoelectric devices.

In one embodiment, the apparatus includes a plurality of thermally innervated material actuators used in parallel.

In one embodiment, the apparatus includes a single thermally innervated material actuator.

In one embodiment, the thermally innervated material actuator is a shape memory alloy wire.

In one embodiment, actuation of the thermally innervated material actuator is translated into a desired motion. In another embodiment, the actuation is translated through a pulley into the desired motion. In another embodiment, the actuation is further translated through a lever into the desired motion. In another embodiment, the desired motion is a massaging motion. In another embodiment, the desired motion is a propagating wave motion. In another embodiment, the desired motion changes pressure on the thighs of a person sitting on a seat having the apparatus.

In one embodiment, the bilayer of TEDs are in direct contact with a seat.

In one embodiment, the bilayers of TEDs are arranged in a bilayer architecture such that a large temperature differential is provided.

In one embodiment, the first and second TEDs perform temperature control of a seat.

In one embodiment, the apparatus is part of a seat.

In accordance with another aspect of the invention, the invention is directed to an apparatus that includes a plurality of actuation devices. Each actuation device includes a thermally innervated material actuator. The thermally innervated material actuator changes shape upon application of a temperature change to the thermally innervated material actuator. Each actuation device further includes first and second TEDs coupled to the thermally innervated material actuator such that the thermally innervated material actuator is between the first and second TEDs. The first and second TEDs apply the temperature change to the thermally innervated material actuator. The plurality of actuation devices are arranged to act in a coordinated manner.

In one embodiment, the first and second TEDs are peltier effect thermoelectric devices.

In one embodiment, each of the actuation devices includes a plurality of thermally innervated material actuators used in parallel.

In one embodiment, each of the actuation devices includes a single thermally innervated material actuator.

In one embodiment, the thermally innervated material actuator is a shape memory alloy wire.

In one embodiment, the first and second TEDs are in direct contact with a seat.

In one embodiment, the coordinated manner includes s a propagating wave motion.

In one embodiment, the plurality of actuator devices are spaced and arranged in a row along the length of a seat. In another embodiment, the plurality of actuator devices are tapered towards a rear of the seat.

In one embodiment, an iterative control process maintains a desired surface wave when the stress applied to the actuator devices is varied.

In one embodiment, the bilayers of TEDs are arranged in a bilayer architecture such that a large temperature differential is provided.

In one embodiment, the first and second TEDs perform temperature control of a seat.

In one embodiment, the apparatus is in a seat.

In accordance with another aspect of the invention, the invention is directed to an apparatus that includes a thermally innervated material actuator. The thermally innervated material actuator changes shape upon application of a temperature change to the thermally innervated material actuator. The apparatus further includes a bilayer of TEDs having first and second TEDs coupled to the thermally innervated material actuator such that the thermally innervated material actuator is between the first and second TEDs. The first and second TEDs apply the temperature change to the thermally innervated material actuator and the first and second TEDs perform temperature control.

In one embodiment, the first and second TEDs are peltier effect thermoelectric devices.

In one embodiment, the apparatus includes a plurality of thermally innervated material actuators used in parallel.

In one embodiment, the apparatus includes a single thermally innervated material actuator.

In one embodiment, the thermally innervated material actuator is a shape memory alloy wire.

In one embodiment, actuation of the thermally innervated material actuator is translated into a desired motion.

In one embodiment, the plurality of actuation devices are arranged to act in a coordinated manner.

In one embodiment, the bilayer of TEDs are in direct contact with a seat.

In one embodiment, the bilayers of TEDs are arranged in a bilayer architecture such that a large temperature differential is provided.

In one embodiment, the apparatus is in a seat.

In accordance with another aspect of the invention, the invention is directed to a seat, that includes a thermally innervated material actuator. The thermally innervated material actuator changes shape upon application of a temperature change to the thermally innervated material actuator. The seat further includes a bilayer of TEDs having first and second TEDs coupled to the thermally innervated material actuator such that the thermally innervated material actuator is between the first and second TEDs. The first and second TEDs apply the temperature change to the thermally innervated material actuator.

In one embodiment, the plurality of actuation devices are arranged to act in a coordinated manner.

In one embodiment, the first and second TEDs perform temperature control of the seat.

In one embodiment, the first and second TEDs are peltier effect thermoelectric devices.

In one embodiment, the apparatus includes a plurality of thermally innervated material actuators used in parallel.

In one embodiment, the apparatus includes a single thermally innervated material actuator.

In one embodiment, the thermally innervated material actuator is a shape memory alloy wire.

In one embodiment, actuation of the thermally innervated material actuator is translated into a desired motion.

In one embodiment, the bilayer of TEDs are in direct contact with a seat.

In one embodiment, the bilayers of TEDs are arranged in a bilayer architecture such that a large temperature differential is provided.

In accordance with another aspect of the invention, the invention is directed to a method that includes providing a thermally innervated material actuator. The thermally innervated material actuator changes shape upon application of a temperature change to the thermally innervated material actuator. The method further includes providing a bilayer of TEDs having first and second TEDs coupled to the thermally innervated material actuator such that the thermally innervated material actuator is between the first and second TEDs. The first and second TEDs apply the temperature change to the thermally innervated material actuator.

In one embodiment, the first and second TEDs are peltier effect thermoelectric devices.

In one embodiment, the thermally innervated material actuator is a shape memory alloy wire.

In one embodiment, actuation of the thermally innervated material actuator is translated into a desired motion. In another embodiment, the actuation is translated through a pulley into the desired motion. In another embodiment, the actuation is further translated through a lever into the desired motion. In another embodiment, the desired motion changes pressure on the thighs of a person sitting on a seat.

In one embodiment, the bilayer of TEDs are in direct contact with a seat.

In one embodiment, the plurality of actuation devices are arranged to act in a coordinated manner.

In one embodiment, the first and second TEDs perform temperature control of a seat.

In accordance with another aspect of the invention, the invention is directed to a method that includes providing a plurality of actuation devices. Each actuation device includes a thermally innervated material actuator. The thermally innervated material actuator changes shape upon application of a temperature change to the thermally innervated material actuator.

Each actuation device further includes first and second TEDs coupled to the thermally innervated material actuator such that the thermally innervated material actuator is between the first and second TEDs. The first and second TEDs apply the temperature change to the thermally innervated material actuator. The plurality of actuation devices are arranged to act in a coordinated manner.

In one embodiment, the first and second TEDs are peltier effect thermoelectric devices.

In one embodiment, the thermally innervated material actuator is a shape memory alloy wire.

In one embodiment, the first and second TEDs are in direct contact with a seat.

In one embodiment, the coordinated manner is a propagating wave motion.

In one embodiment, an iterative control algorithm maintains a desired surface wave when the stress applied to the actuator devices is varied.

In one embodiment, the first and second TEDs perform temperature control of a seat.

In accordance with another aspect of the invention, the invention is directed to a method that includes providing a thermally innervated material actuator. The thermally innervated material actuator changes shape upon application of a temperature change to the thermally innervated material actuator. The method further includes providing a bilayer of TEDs having first and second TEDs coupled to the thermally innervated material actuator such that the thermally innervated material actuator is between the first and second TEDs. The first and second TEDs apply the temperature change to the thermally innervated material actuator and the first and second TEDs perform temperature control of a seat including the first and second TEDs.

In one embodiment, the first and second TEDs are peltier effect thermoelectric devices.

In one embodiment, the thermally innervated material actuator is a shape memory alloy wire.

In one embodiment, actuation of the thermally innervated material actuator is translated into a desired motion. In another embodiment, the desired motion changes pressure on the thighs of a person sitting on a seat.

In one embodiment, the bilayer of TEDs are in direct contact with a seat.

In one embodiment, the plurality of actuation devices are arranged to act in a coordinated manner.

In accordance with another aspect of the invention, the invention is directed to a method that includes a method of providing controlled motion to a seat that includes providing a thermally innervated material actuator. The thermally innervated material actuator changes shape upon application of a temperature change to the thermally innervated material actuator. The method further includes providing a bilayer of TEDs having first and second TEDs coupled to the thermally innervated material actuator such that the thermally innervated material actuator is between the first and second TEDs. The first and second TEDs apply the temperature change to the thermally innervated material actuator.

In one embodiment, the plurality of actuation devices are arranged to act in a coordinated manner.

In one embodiment, first and second TEDs perform temperature control of the seat.

In one embodiment, the first and second TEDs are peltier effect thermoelectric devices.

In one embodiment, the thermally innervated material actuator is a shape memory alloy wire.

In one embodiment, the thermally innervated material actuator is translated into a desired motion.

In one embodiment, the bilayer of TEDs are in direct contact with a seat.

The present invention is directed to an apparatus and method applied to, for example, an active robotic car seat, in which contact pressure on the tissue of the driver, such as the thighs and hips, is actively redistributed, thus providing relief to the weary driver. To accommodate the distributed nature of the surface actuation and space limitations in the car seat, a large number of small, lightweight actuators are used and are confined to a small volume. Integrated devices which include shape memory alloy (SMA) actuators and thermoelectric devices (TED) are used to provide the necessary actuation plus a rapid heating and cooling function. These devices are suited to the application of an active car seat, due to their high power-to-weight ratio. A matrix architecture is used for the actuator drive amplifier that can drive $N^2$ actuator units using only $2N$ switches and is thus suitable for vast degree of freedom systems in terms of scalability. In one particular exemplary embodiment, the seat 11 uses 16 SMA actuator units, which are driven in a matrix architecture using eight switches. The actuators are compactly housed under the car seat, and the force and displacements are transmitted to the flexible seat surface through a novel routing scheme. A distributed lifting motion of the seat surface in order to stimulate the tissue is generated. A complementary distributed sinking motion of the seat surface is created in order to provide pressure relief and ventilation. Additional auxiliary motions of the side flaps of the backrest are also created.

The invention provides an active seat surface that creates wave motion. The wave motion is created using straps of fabric laid on the seat surface. The wave motion on the seat surface alters the pressure distribution on the driver and removes heat and moisture at the contacting surface.

The invention also provides an integrated shape memory alloy (SMA) actuator and thermoelectric device (TED). The thermoelectric devices provide heating and cooling for activating and deactivating the shape memory alloy actuators, as well as a local heating and cooling for the seat of the invention.

The device includes shape memory alloy actuators sandwiched between upper and lower thermoelectric devices. In one configuration, the thermoelectric devices are packaged in a box with inlets and outlets for airflow to provide for ventilation.

The device operates in an actuation mode, a cooling mode and a heating mode. In the actuation mode, the shape memory alloy actuators are activated to create controlled motion in the seat by generating heat towards the actuators using the thermoelectric devices on top and bottom of the shape memory alloy actuators. The actuators are deactivated by creating heat flow in the reverse direction.

In the cooling mode, cool air is transferred to the seat. First, heat flow is generated using the thermoelectric devices such that the heat is extracted from the top surface to the bottom surface of the thermoelectric devices. Airflow is created on the top surface, and a valve is opened such that the outlet of the air channel that flows through the top surface goes to the seats.

In the heating mode, hot air is transferred to the seat. First, heat flow is generated using the thermoelectric devices such that the heat is extracted from the bottom surface to the top surface of the thermoelectric device. Airflow is created on the top surface, and a valve is opened such that the outlet of the sir channel that flows through the top surface goes to the seats.

The invention also provides a lifting and sinking apparatus and method for a seat. Multiple lifting motions are created sequentially to alter the pressure distribution on the tissue and remove heat and moisture at the contacting surface. The lifting and sinking motions are also created by straps laid under the fabric of the seat. Pulling of the fabric reduces the length of the strap and thereby lifts the strap creating pressure on the body. In order to create this motion, side panels to hold the edges of the strap are used. These change the direction of the force or displacement from lateral to vertical. The sinking motion is created by pulling down certain points of the seat. The sinking motion creates crater-like depressurized zones that enhance the blood circulation and enhance ventilation at the sinking points.

In accordance with the invention, auxiliary motion in the seat is also created. The displacement of the SMA wires is further used for auxiliary motions of the side flaps for a car backrest. The side flaps can be used to cradle the body better, especially during turning. The side flaps are actuated by transmitting the motion of SMA actuator units from the actuator box, which is placed under the car seat. The issue of limited displacement of SMA actuators is overcome in the invention by using a ratcheting mechanism. The position of the side flaps is controlled in small discrete steps, thereby eliminating the need to control the position of the individual SMA actuator units. A routing scheme, using Kevlar wires and cable housing, from the actuator box to the point of actuation is also used.

In one aspect, the invention is directed to an apparatus which includes a shape memory alloy (SMA) element which changes shape upon application of a temperature change to the SMA element. A thermoelectric device (TED) is coupled to the SMA element. Heat flows through the TED upon application of an electrical current through the TED. The apparatus is operable in one of a plurality of modes. In a first mode, a current is applied through the TED to cause a temperature change in the SMA element to change the shape of the SMA element. In a second mode, a current is applied to the TED to cause heat flow in a space adjacent to the apparatus.

In one embodiment, in the second mode, the space is heated. Alternatively, in the second mode, the space is cooled. The current flowing in the TED in the first mode is in a reverse direction to that of the current flowing in the TED in the second mode.

In one embodiment, the SMA element is disposed between first and second TEDs.

In one embodiment, the SMA element is in the form of a wire in thermal communication with the TED, such that, upon application of a current to the TED, the wire SMA element shortens. In one embodiment, the wire SMA element is connected to at least one actuating member to provide actuation of the actuating member upon application of the current to the TED.

In one embodiment, the apparatus is located within a seat. In one embodiment, in the second mode, the current applied to the TED effects heating of the seat. In one embodiment, in the second mode, the current applied to the TED effects cooling of the seat. In one embodiment, the seat includes an actuating member, the SMA element being coupled to the actuating member to provide actuation of the actuating member upon application of the current to the TED. In one embodiment, the actuating member provides a rising motion to at least a portion of the seat. In one embodiment, the actuating member provides a sinking motion to at least a portion of the seat. In one embodiment, a plurality of actuating members are coupled to at least one SMA element to provide actuation of the actuating members upon application of the current to the TED. In one embodiment, the actuation provides motion in a predetermined pattern in the seat.

In one embodiment, the predetermined pattern is a wave motion. In one embodiment, the predetermined pattern is a pattern of at least one of rising motions and sinking motions. The seat can be an automobile seat.

In another aspect, the invention is directed to a seat having a plurality of actuation regions at which motion can be effected in the seat. An actuation device is coupled to the actuation regions, the actuation device comprising: (i) a shape memory alloy element (SMA), the SMA element changing shape upon application of a temperature change to the SMA element, and (ii) a thermoelectric device (TED) coupled to the SMA element, heat flowing through the TED upon application of an electrical current through the TED. In one embodiment, the seat is operable in one of a plurality of modes. In a first mode, a current is applied through the TED to cause a temperature change in the SMA element to change the shape of the SMA element to actuate at least one of the actuation regions to effect motion in the seat. In a second mode, a current is applied to the TED to cause heat flow in the seat.

In one embodiment, in the second mode, the seat is heated. In one embodiment, in the second mode, the seat is cooled. In one embodiment, the current flowing in the TED in the first mode is in a reverse direction to that of the current flowing in the TED in the second mode. In one embodiment, the SMA element is disposed between first and second TEDs. In one embodiment, the SMA element is in the form of a wire in thermal communication with the TED, such that, upon application of a current to the TED, the wire SMA element shortens. In one embodiment, the actuation device provides a rising motion to at least a portion of the seat. In one embodiment, the actuation device provides a sinking motion to at least a portion of the seat. In one embodiment, the actuation device provides motion in a predetermined pattern in the seat. In one embodiment, the predetermined pattern is a wave motion. In one embodiment, the predetermined pattern is a pattern of at least one of rising motions and sinking motions.

In one embodiment, the seat is an automobile seat.

In another aspect, the invention is directed to a method comprising: (i) providing a shape memory alloy (SMA) element, the SMA element changing shape upon application of a temperature change to the SMA element, (ii) providing a thermoelectric device (TED) coupled to the SMA element, heat flowing through the TED upon application of an electrical current through the TED, and (iii) performing one of two operations in one of two respective modes. In a first mode, a current is applied through the TED to cause a temperature change in the SMA element to change the shape of the SMA element. In a second mode, a current is applied to the TED to cause heat flow in a space adjacent to the apparatus.

In one embodiment, in the second mode, the space is heated. In one embodiment, in the second mode, the space is cooled. In one embodiment, the current flowing in the TED in the first mode is in a reverse direction to that of the current flowing in the TED in the second mode. In one embodiment, the SMA element is disposed between first and second TEDs.

In one embodiment, the SMA element is in the form of a wire in thermal communication with the TED, such that, upon application of a current to the TED, the wire SMA element shortens. In one embodiment, the wire SMA element is connected to at least one actuating member to provide actuation of the actuating member upon application of the current to the TED.

In one embodiment, the method is carried out within a seat. In one embodiment, in the second mode, the current applied to the TED effects heating of the seat. In one embodiment, in the second mode, the current applied to the TED effects cooling of the seat. In one embodiment, the seat includess an actuating member, the SMA element being coupled to the actuating member to provide actuation of the actuating member upon application of the current to the TED. In one embodiment, the actuating member provides a rising motion to at least a portion of the seat. In one embodiment, the actuating member provides a sinking motion to at least a portion of the seat. In one embodiment, a plurality of actuating members are coupled to at least one SMA element to provide actuation of the actuating members upon application of the current to the TED. In one embodiment, the actuation provides motion in a predetermined pattern in the seat. In one embodiment, the predetermined pattern is a wave motion. In one embodiment, the predetermined pattern is a pattern of at least one of rising motions and sinking motions.

In one embodiment, the seat is an automobile seat.

In another aspect, the invention is directed to a method comprising: (i) providing a plurality of actuation regions at which motion can be effected in a seat, (ii) providing an actuation device coupled to the actuation regions. The actuation device includes: (i) a shape memory alloy element (SMA), the SMA element changing shape upon application of a temperature change to the SMA element, and (ii) a thermoelectric device (TED) coupled to the SMA element, heat flowing through the TED upon application of an electrical current through the TED. The seat is operable in one of a plurality of modes. In a first mode, a current is applied through the TED to cause a temperature change in the SMA element to change the shape of the SMA element to actuate at least one of the actuation regions to effect motion in the seat. In a second mode, a current is applied to the TED to cause heat flow in the seat.

In one embodiment, in the second mode, the seat is heated. In one embodiment, in the second mode, the seat is cooled. In one embodiment, the current flowing in the TED in the first mode is in a reverse direction to that of the current flowing in the TED in the second mode.

In one embodiment, the SMA element is disposed between first and second TEDs.

In one embodiment, the SMA element is in the form of a wire in thermal communication with the TED, such that, upon application of a current to the TED, the wire SMA element shortens.

In one embodiment, the actuation device provides a rising motion to at least a portion of the seat. In one embodiment, the actuation device provides a sinking motion to at least a portion of the seat.

In one embodiment, the actuation device provides motion in a predetermined pattern in the seat. In one embodiment, the predetermined pattern is a wave motion. In one embodiment, the predetermined pattern is a pattern of at least one of rising motions and sinking motions.

In one embodiment, the seat is an automobile seat.

Hence, the invention is directed to a new approach to car seat design for alleviating long-drive fatigue. To enhance blood circulation as well as to keep the skin temperature and moisture at desired levels, an active control of the seat surface is accomplished with the use of Shape Memory Alloy (SMA) wire actuators. Since SMA actuators have high power-to-weight ratio, a multitude of SMA actuators can be embedded in a limited space.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
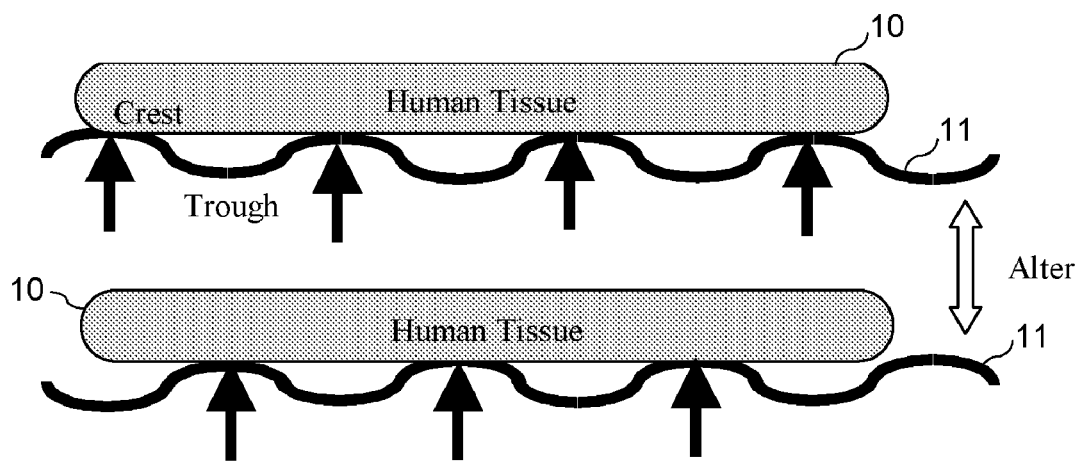
FIG. 1 contains a schematic diagram of an active seat surface for altering pressure distribution on a person in accordance with an embodiment of the invention.

FIG. 1 contains a schematic diagram of an active seat surface 11 for altering pressure distribution on a person in accordance with an embodiment of the invention. As illustrated in the figure, the body of the user, illustrated by human tissue 10, is supported at different areas of contact, so that the pressurized tissue areas may be changed. The figure shows a wave pattern of crests and troughs that are altered periodically. Referring to the "before" and "after" views, the motion of the wave pattern of crests and troughs is observed.

Figure 2:
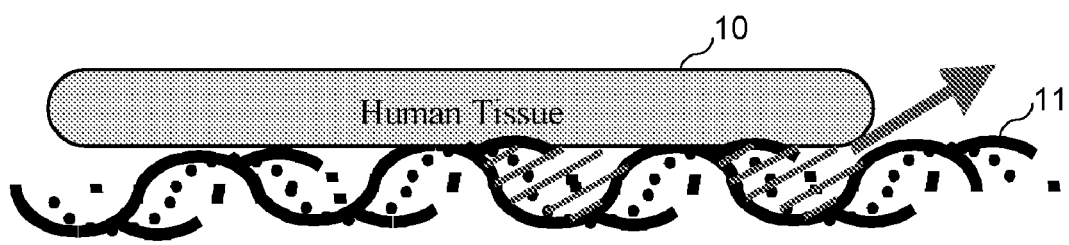
FIG. 2 contains a schematic diagram of the active seat surface of the invention shown in FIG. 1, illustrating propagating surface waves for removing hot, humid air.

FIG. 2 contains a schematic diagram of the active seat surface 11 of the invention shown in FIG. 1, illustrating propagating surface waves for removing hot, humid air. To remove heat and moisture at the contact area, the air gap between the crest and the trough is relatively large. Furthermore, if the wave propagates, as shown in FIG. 2, the air of high moisture and temperature that is captured between the human skin and the trough may be transferred sideways and removed from the contact surface. This enhances the ventilation effect.

Pressure relief and ventilation are the two major functional requirements for enhancing long-drive comfort and alleviating fatigue. The surface activation method described above directly controls the contacting surface and meets the functional requirements. To implement the surface activation method, a new type of actuator system in accordance with the invention is used. The distributed nature of surface activation requires a large number of degrees of freedom. Considering the limited space for actuators, actuators are of high energy density, i.e., compact and powerful. To this end, shape memory alloy (SMA) actuators, for activating many points on the seat surface, are used.

To create a wave motion on the seat surface and actuation for other purposes related to the car seat or chair, a device that integrates the shape memory alloy actuators with the thermoelectric device is provided. The device includes shape memory alloy actuators placed between the two thermoelectric devices. The thermoelectric devices provide heating and cooling for activating and deactivating the shape memory alloy actuators, as well as a local heating and cooling for the chairs.

Figure 3:
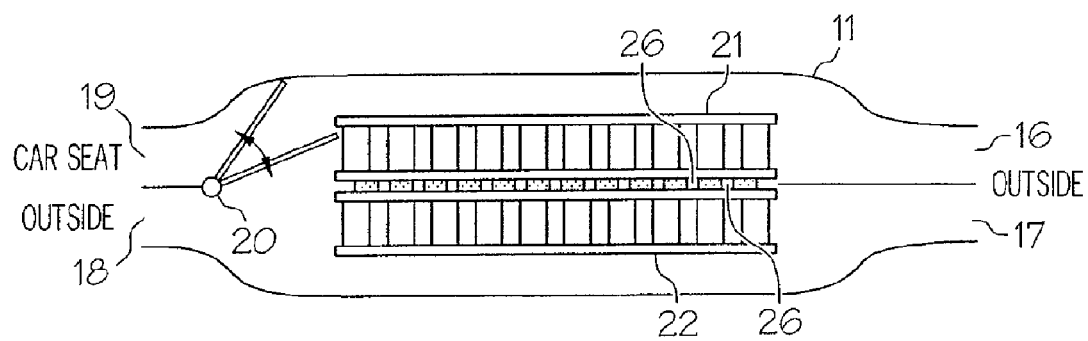
FIG. 3 contains a schematic diagram of the integrated SMA and TED device used with an active car seat in accordance with an embodiment of the invention.

FIG. 3 contains a schematic diagram of the integrated SMA and TED device used with an active car seat 11 in accordance with an embodiment of the invention. The device includes multiple axis of SMA actuators placed perpendicular to air flow inlets 16, 17 and outlets 18, 19. Air flows through the top and bottom surfaces of the integrated SMA/TED device. A valve 20 is used to control the direction of the air flow that passes the top surface of the seat 11. As shown in FIG. 3, in the actuation mode, the valve 20 is positioned such that any air flowing into inlets 16 and 17 flows out only through outlet 18. Thermoelectric devices 21 and 22 are mounted within the seat 11 facing each other as shown. The SMA actuators 26 in the shape of wires are interposed between and in thermal contact with surfaces of the thermoelectric devices 21, 22. The TEDs operate to create a temperature difference between their top and bottom surfaces, and, therefore, heat flow between the surfaces, upon application of an electrical potential across the surfaces. Upon application of a potential of a first polarity orientation, heat flows in a first direction from one surface to the other. Potential applied across the device in the opposite polarity orientation causes heat flow in the opposite direction. The SMA actuators 26 are activated when the TEDs 21, 22 on top and bottom of the SMA actuators 26 all generate heat towards the actuators. The heat applied to the actuators 26 interposed between the TEDs causes the shape of the SMA actuators to change, such as by increasing or decreasing their length. This actuation motion is coupled throughout the active seat and controlled as needed to provide the sinking, lifting, wave and other motions provided in the seat 11.

Figure 4:
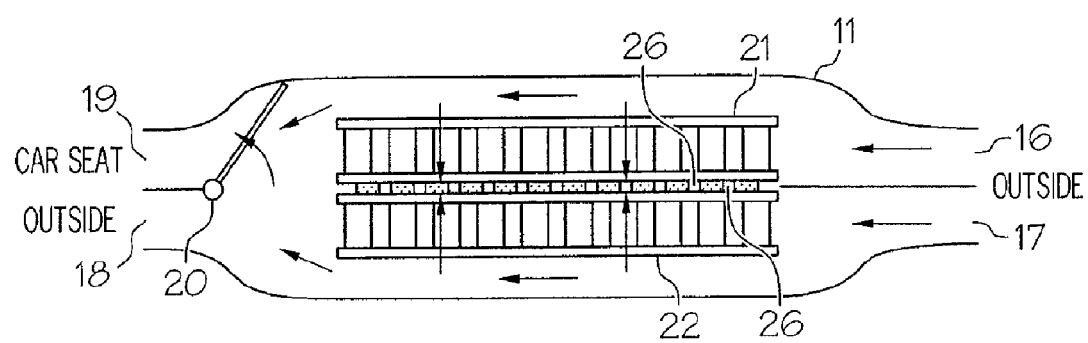
FIG. 4 contains a schematic diagram of the active car seat of the invention in the actuation mode, according to an embodiment of the invention.

FIG. 4 contains a schematic diagram of the active car seat 11 of the invention in the actuation mode, according to an embodiment of the invention. The SMA material reaches temperatures well above austenite finish temperature by using the sandwiched configuration illustrated, i.e., the SMA actuators 26 being interposed between the TEDs. By applying potential to both TEDs 21, 22 in the polarity orientation that causes heat to flow toward the SMA actuators 26 from both top and bottom TEDs 21, 22, the temperature of the SMA actuators rises sufficiently to provide the required seat actuation motion. The SAM actuators 26 are deactivated by reversing the polarity of the potential applied to the TEDs to move the heat that is gathered in the center of the device towards the outer surface of the device.

Figure 5:
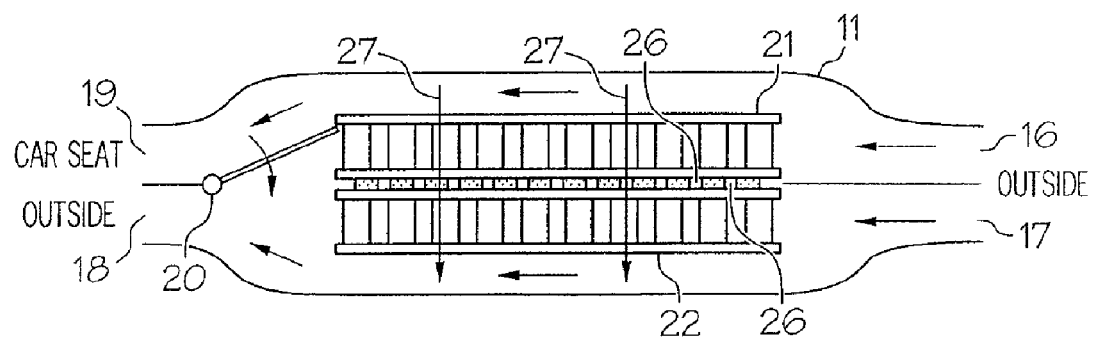
FIG. 5 contains a schematic diagram of the active car seat of the invention in the cooling mode, according to an embodiment of the invention.

The device of the invention can be used to generate cold or hot air for local cooling and heating of the seat 11, without activating the actuators. FIG. 5 contains a schematic diagram of the active car seat 11 of the invention in the cooling mode, according to an embodiment of the invention. By generating the heat flow using the thermoelectric devices 21, 22 such that the heat flows from the top surface to the bottom surface of the integrated SMA/TED device, as indicated by arrows 27. The air that enters at the top surface at inlet 16 cools, and is sent to the top surface of the car seat 11 for local cooling. Enough cooling can be done without activating the actuators, since the temperatures of the shape memory alloys are kept below the austenite starting temperature even though the top surface is sufficiently cooled. In the cooling mode, air enters the top of the seat through inlet 16 and flows along the top surface of the car seat 11 to cool it. The cooling air then exits through the outlet 19. The valve 20 is set to allow the air to exit through the outlet 19. Air also enters the bottom region of the car seat 11 through inlet 17 and flows along the bottom heated surface of the integrated SMA/TED device to remove heat from the interior of the seat 11. Air carrying the heat away exits the seat 11 through the outlet 18.

Figure 6:
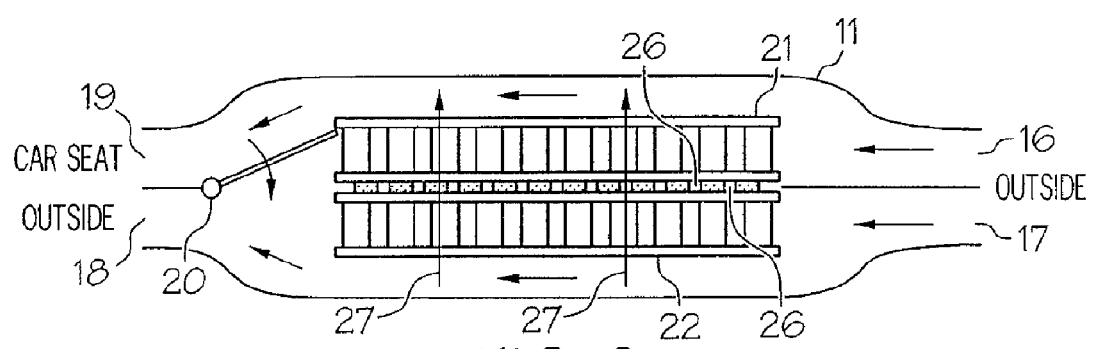
FIG. 6 contains a schematic diagram of the active car seat of the invention in the heating mode, according to an embodiment of the invention.

FIG. 6 contains a schematic diagram of the active car seat 11 of the invention in the heating mode, according to an embodiment of the invention. The heating mode is essentially functionally opposite of the cooling mode. That is, in the heating mode, the TEDs 21, 22 are activated by applied potential to cause heat to flow from the bottom surface to the top surface of the integrated SMA/TED device, as indicated by arrows 27. The heat is transmitted via the TEDs 21, 22 from the bottom surface to the top surface, thereby creating a hot area at the top surface. The air that enters the seat 11 at inlet 16 is heated for local heating of the seat. The valve 20 is again set to permit the warm air to exit the seat 11 at outlet 19.

The massage functions of the active car seat of the invention are unique in that they do not interfere with driving. The massage function provides pressure redistribution and enhanced ventilation through active control of the seat surface. The redistribution of pressure does not interfere with the driver's driving capability. Many points of the seat 11, which are wide enough to cover the whole bottom part of the body, are activated. The mechanism is not perceptible when the massage is not being performed. The actuator mechanism is light enough to be installed in a car, where the weight of the system is directly related to the fuel efficiency. Although light, the actuator mechanism has enough power to pressurize the body so as to provide enough stimulation.

In accordance with the invention, two complementary motions fulfill the fundamental requirements of pressure redistribution and ventilation. These are generically called the lifting motion and the sinking motion. The purpose of the lifting motion is to redistribute the pressure on the thighs and the hips of the driver, and the purpose of the sinking motion is to provide ventilation. By combining these motions to create a large gap between the seat and the body surface, the ventilation effect is enhanced. Both motions are created by pulling the end of a cable or a strap of fabric that is placed on the bottom foam of the car seat 11. The cables are connected to the integrated SMA/TED devices such that selective and controlled activation of those devices provides the desired lifting and sinking motions. Rigid mechanical components are not used for the mechanism such that considerable weight reduction is realized. Furthermore, the system complies with the shape of the human body. Thus the mechanism is imperceptible to the driver when it is not being used.

Figure 7:
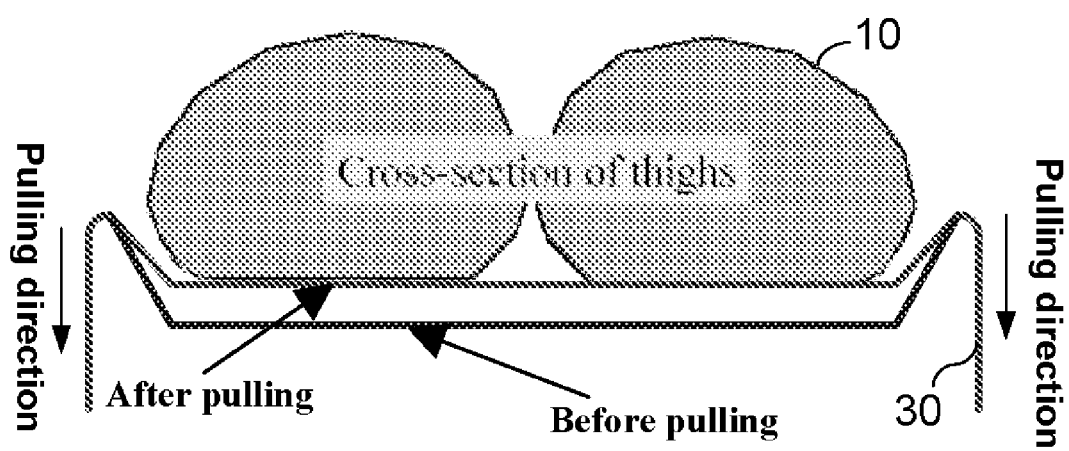
FIG. 7 contains a schematic diagram illustrating the lifting motion according to an embodiment of the invention.

FIG. 7 contains a schematic diagram illustrating the lifting motion according to an embodiment of the invention. FIG. 7 schematically illustrates the driver's thighs 10 in cross-section over the mechanism for providing the lifting. The mechanism of the invention, through activation of the integrated SMA/TED devices, pulls on a cable or strap 30, preferably at both ends of the strap 30. to provide the lifting motion to the driver's legs and thighs. The pulling of the fabric lifts the strap creating pressure on the body. In order to create this motion, side panels to hold the edges of the strap are used. These change the direction of the force or displacement from lateral to vertical.

Figure 8:
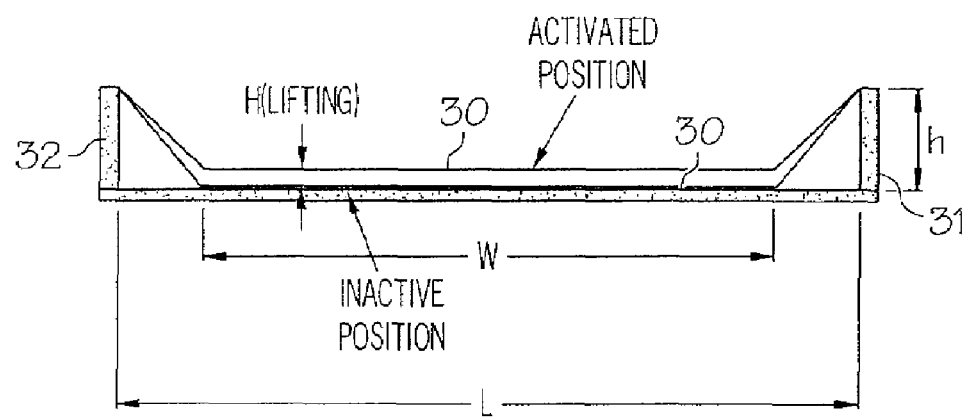
FIG. 8 contains a schematic diagram illustrating the geometry of the lifting motion mechanism, in accordance with the invention.

FIG. 8 contains a schematic diagram illustrating the geometry of the lifting motion mechanism. The height h of the sidebar 31, the width of the thighs, and the width of the chair all contribute to the amount of lifting height when the fabric is pulled a certain length. Referring to FIG. 8, the straps 30 are assumed to be a straight line and maintained straight with a width of W throughout the operation. Although actual shape of the strap would be a shape of the hip or thigh of the person sitting on it, the straight line of the strap is regarded as a virtual line that connects the two end points of the contact between the strap and the human body. In one embodiment, to prevent the lifting motion from interfering with the driver's driving capability, lifting height H is limited to less than 1 inch. The required displacement d, of the SMA actuator, given the required lifting height of H, is $$d = 2\sqrt{(h-H)^2 + \left(\frac{L-W}{2}\right)^2} - \sqrt{h^2 + \left(\frac{L-W}{2}\right)^2} \qquad (1)$$

where L is the width of the chair, h is the height of the sidebar, and W is the width of the thigh or hip of the person sitting on the chair. Based on measurements of an average person, and from the requirement that the lifting motion should not interfere with the driving, the width of the thighs used for design was 12 inches, and required lifting height was chosen to be 0.75 inches. From the given specifications, the displacement of the actuator needed is 0.89 inches. This is achieved by using a SMA wire of length 12.82 inches.

Figure 9:
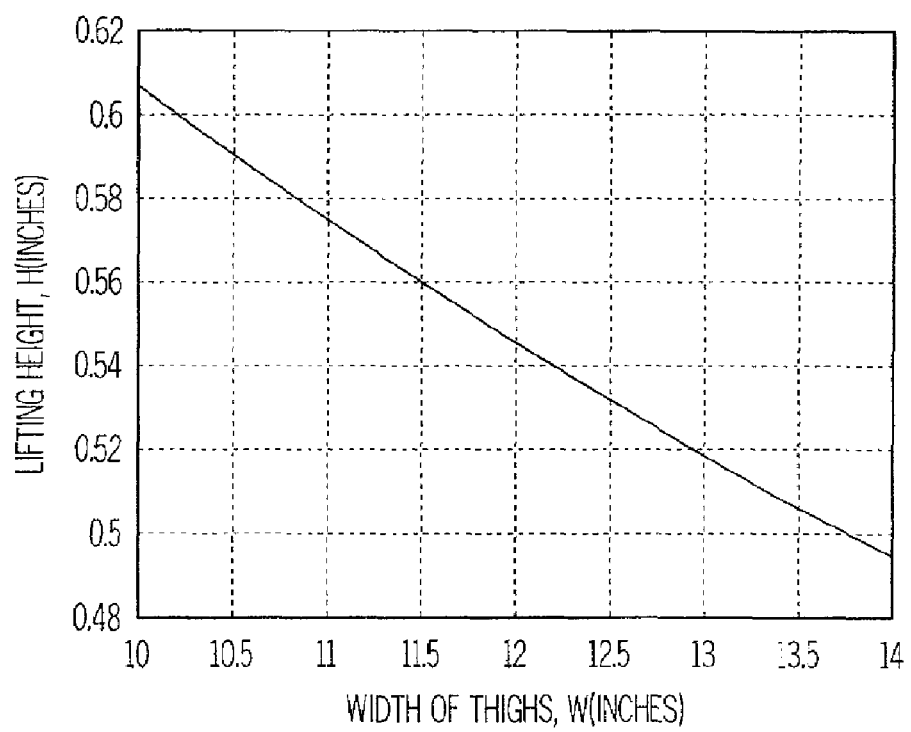
FIG. 9 is a curve showing variation of lifting height H as W changes from 10 inches to 14 inches, according to the invention.

As the width of the thighs or hips are different from person to person, the lifting height changes as a function of W. FIG. 9 is a curve showing variation of lifting height H as W changes from 10 inches to 14 inches. The lifting height becomes smaller as the width of the thighs becomes larger. Specifically, the lifting height changes from 0.82 to 0.49 inches, as the width changes from 10 to 14 inches.

Figure 10:
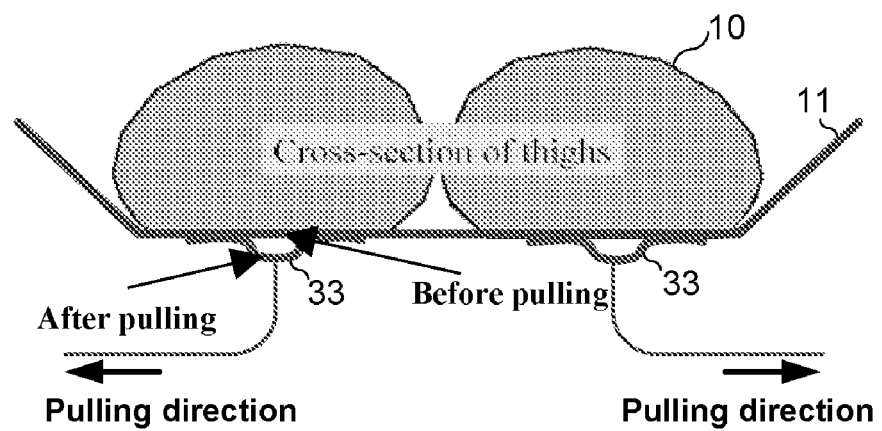
FIG. 10 contains a schematic diagram illustrating the sinking motion according to an embodiment of the invention.

FIG. 10 contains a schematic diagram illustrating the sinking motion according to an embodiment of the invention. FIG. 10 schematically illustrates the driver's thighs 10 in cross-section over the mechanism for providing the sinking in the surface of the seat 11. FIG. 10 shows the sinking motion created by pulling down certain points of the seat 11. Sinking motion creates crater-like depressurized zones 33 that enhance the blood circulation at the point and also enhance the ventilation at the points. In one particular illustrative embodiment, two depressurizing zones 33 are used at the thighs and three depressurized zones 33 are used along the center of the hips, where ventilation is most effective. The mechanism of the invention, through activation of the integrated SMA/TED devices, pulls on a cable or strap that is attached to the underside of the seat surface at the depressurized zones 33.

Figure 11:
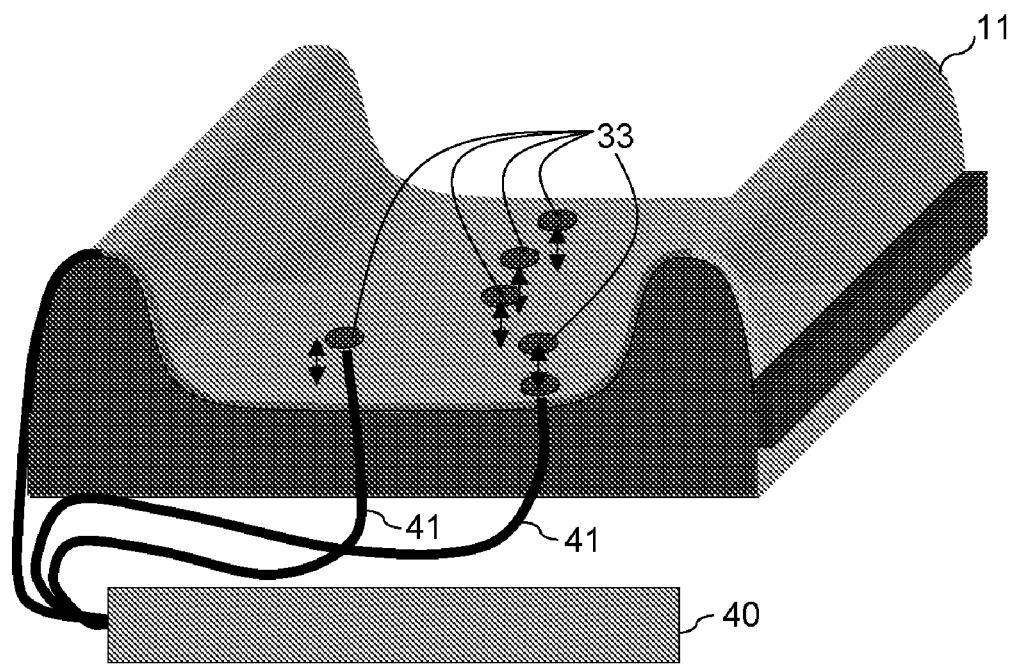
FIG. 11 is an image which schematically illustrates the positions of the pulling down points for creating the depressurized zones in the active car seat according to one particular illustrative embodiment, for the sinking motion of the invention.

FIG. 11 is an image which schematically illustrates the positions of the pulling down points for creating the depressurized zones 33 according to one particular illustrative embodiment, for the sinking motion of the invention. In this particular embodiment, five sinking points are illustrated. It will be understood that any number of sinking point can be used in accordance with the invention. The pulling down points are connected to the SMA actuators in the actuator box 40 via wires or cables 41. The displacement provided by activation of the SMA actuators is transferred to the pulling down points via the wires or cables 41. In one embodiment, these wires or cables 41 are Kevlar wires routed to the actuator box 40 via turnbuckles. The tensions in the Kevlar wires can be adjusted by means of the turnbuckles, thus preventing slack.

Figure 12:
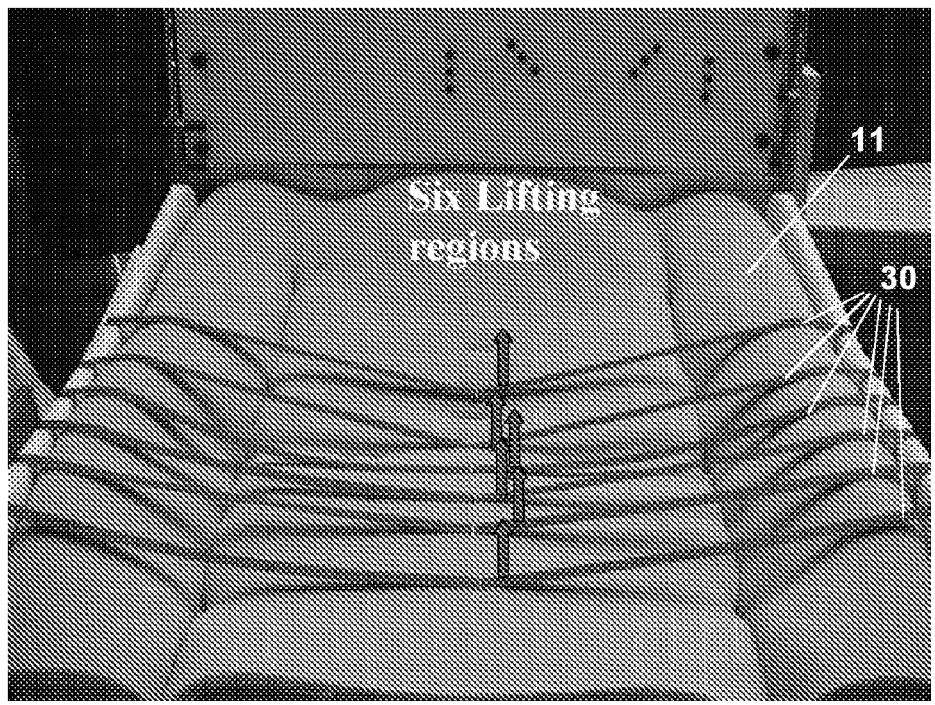
FIG. 12 contains an image illustrating an uncovered active car seat 11 in accordance with an embodiment, of the invention, illustrating one embodiment of the lifting motion mechanism of the invention.

FIG. 12 contains an image illustrating an uncovered active car seat 11 in accordance with an embodiment, of the invention, illustrating one embodiment of the lifting motion mechanism of the invention. FIG. 12 shows the arrangement of straps 30 disposed over the seat 11 for the lifting motion. In one particular embodiment, the straps include six ⅜ inch wide straps made out of polyethylene fibers to create the lifting motions. The straps are attached to the Kevlar wires 41 coming out of the actuator box 40 by means of turnbuckles. The tensions of the Kevlar wires can be adjusted by means of the turnbuckles, thus preventing slack. The other end of the strap is attached to another length adjustment mechanism that makes it possible to adjust to different weights of the person sitting on the seat.

Figure 13:
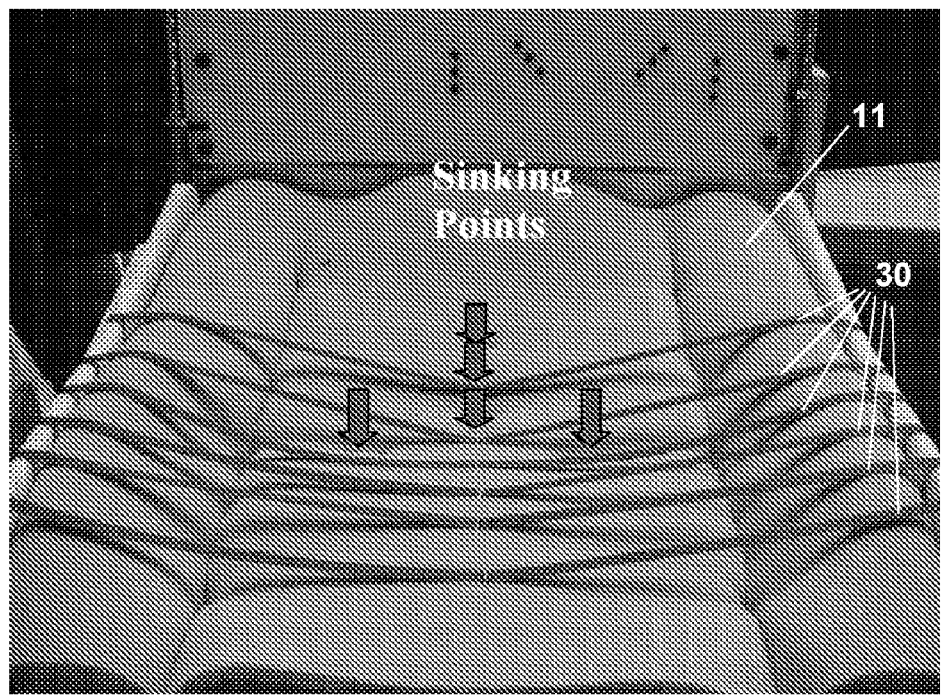
FIG. 13 contains an image illustrating the uncovered car seat of FIG. 12, with the sinking points of the invention also illustrated.

FIG. 13 contains an image illustrating the uncovered car seat 11 of FIG. 12, with the sinking points of the invention also illustrated. As shown in FIG. 13, the sinking points are distributed on the base of car seat 11. The sinking points are created by passing the Kevlar wires into the base foam of the seat 11 and connecting them to the SMA actuators 26 in the actuator box 40. When the actuators are activated, the wires pull down the sinking points and this results in crater-like depressions on the base foam. This gives rise to pressure relief and enhanced ventilation.

Figure 14:
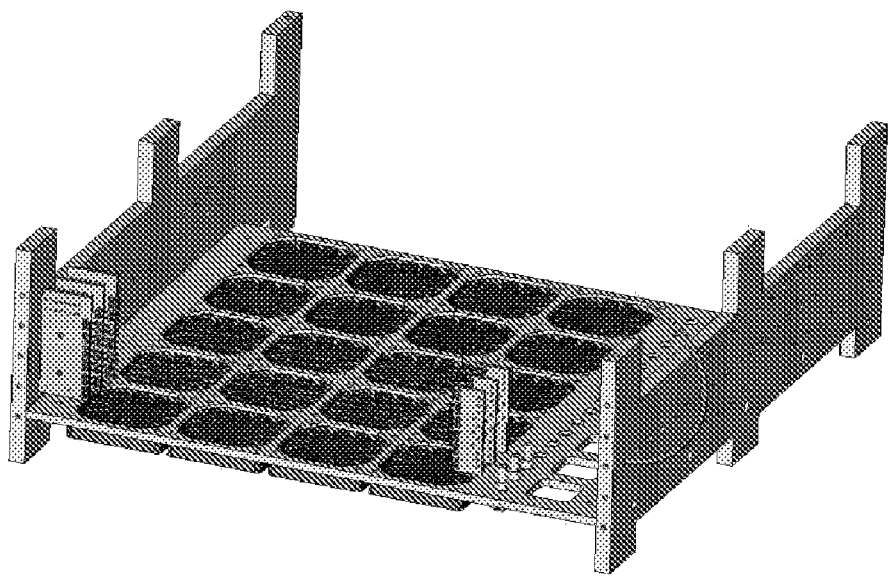
FIG. 14 is an image illustrating a model of one embodiment of an actuator box in accordance with the invention.
Figure 15:
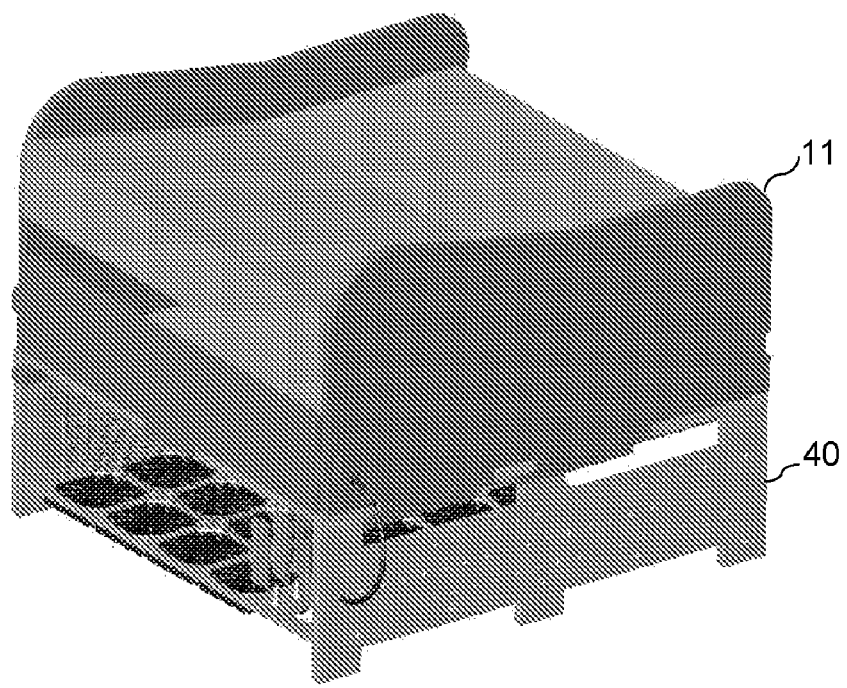
FIG. 15 is an image containing an illustration of a portion of an active car seat of the invention mounted over the actuator box of the invention.

FIG. 14 is an image illustrating a model of one embodiment of an actuator box in accordance with an embodiment of the invention, and FIG. 15 is an image containing an illustration of a portion of an active car seat 11 of the invention mounted over the actuator box 40 of the invention.

In accordance with the invention, auxiliary motion is also provided to the active car seat 11 of the invention. According to the auxiliary motion, side flaps in the upper backrest portion of the seat are moved over an angular range of about 30 degrees. Discrete motion of the flaps is achieved in small steps. The SMA actuators are used to move the flaps. This requires substantial displacement for the individual SMA actuator units. The mechanism uses, in one embodiment, four SMA actuator units in a pair-wise antagonistic fashion. A ratcheting mechanism with locking is used to respond to the limited amount of displacement provided by the SMA actuators.

Thus, in accordance with the invention, active control of the car seat surface is achieved. According to the invention, the actuator units are housed in a compact actuator box 40 under the car seat 11, and cables or wires are used to transmit the force and displacements to the actuation points on the seat surface. A distributed lifting and sinking motion on the surface of the car seat is achieved in order to enhance blood circulation by pressure redistribution as well as to keep the skin temperature and moisture at desired levels.

Figure 16:
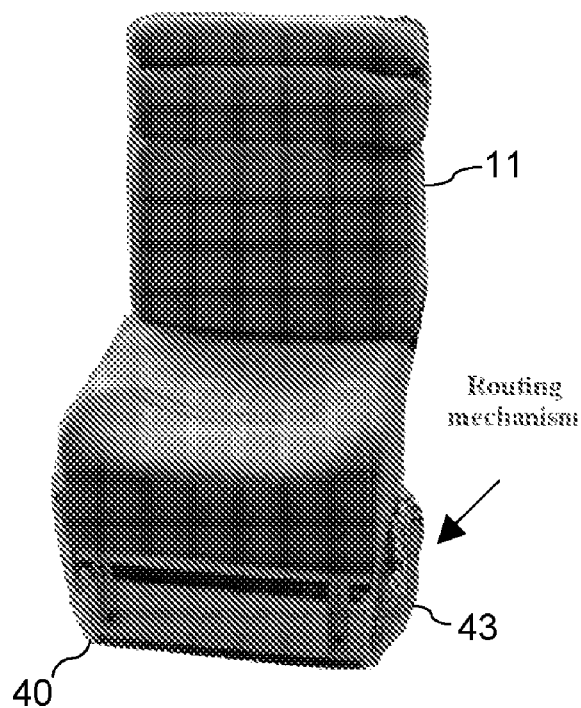
FIG. 16 contains an image of the robotic car seat of the invention covered with automotive upholstery.

FIG. 16 contains an image of the robotic car seat 11 of the invention covered with automotive upholstery. The robotic seat 11 includes an actuator box 40 that has, in one embodiment, sixteen SMA actuators and fits under the car seat 11. A routing mechanism 43 transmits the forces and displacements from the actuator box 40 to the desired actuation points in the seat. The lifting and the sinking motions described above can be accomplished with this set-up.

Figure 17:
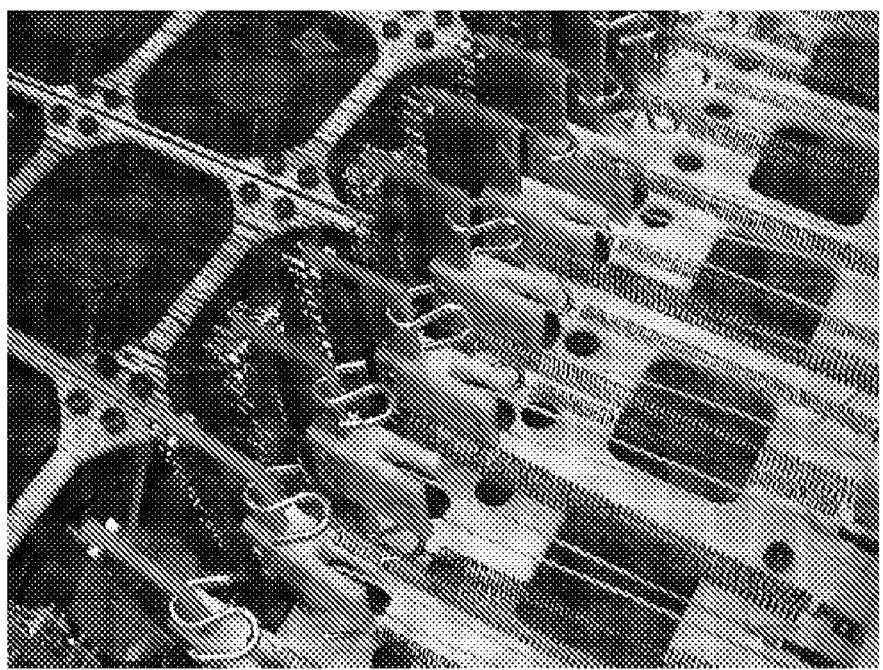
FIG. 17 comprises an image of detailed hardware used in the actuator box of the invention.

FIG. 17 comprises an image of detailed hardware used in the actuator box 40. As noted above, the actuator box 40 includes sixteen SMA actuators. Each actuator includes multiple SMA wires attached to a Printed Circuit Board (PCB). Although the SMA wires are mechanically in parallel, they are configured in a mix of serial and parallel connections electrically. If all the wires are connected in parallel electrically, the total resistance of the actuator becomes too low. This makes it difficult to design the drive circuitry. Therefore the SMA wires are electrically configured in order to maintain the resistance of the actuator to be between 1 to 10 ohms. By reconfiguring the wires electrically, all the necessary electrical wirings can be done at one end, making it simple to design mechanical parts at the moving end of the actuator.

In one embodiment, the length of each SMA tendon cable or wire is 12.5 inches, and each wire has a diameter of 0.015" or 0.01". Each tendon cable provides 110 to 220 N of force and a 12 mm stroke. Six of the actuators are designed for a force requirement of 36 kgf in order to be used for lifting motion. All other actuators are designed with a force requirement of 10 kgf. The actuators are cooled by an array of fans that are placed under them. A bias spring is connected at the ends of each actuator to ensure that they return to their natural length when the current is turned off. A pulley system is attached at the end of the moving PCB in order to amplify the limited displacement provided by the SMA. Kevlar wires are used to transmit the force and displacement generated by the actuator to each mechanism. Kevlar has a breaking strength that is five times greater than steel wire, but is much lighter.

In one embodiment, each actuator of the sixteen actuators includes 12 to 36 actuator wires or tendon cables, depending on the force requirement. For the lifting motion actuators, there are 36 0.38 mm diameter SMA wires or tendon cables, providing a force of 72 kgf with 36 kgf being due to pulleys. The displacement is 20 mm actual due to stress. The actuators operate at 1 ohm and 16 Amps. The actuators for sinking motion and the auxiliary flap motion include 24 0.25 diameter SMA wires or tendon cables. A force of 22.5 kgf, 11.25 kgf due to pulleys, is generated. The displacement is 20 mm. The actuators operate at 10 ohms and 2 Amps.

Figure 18:
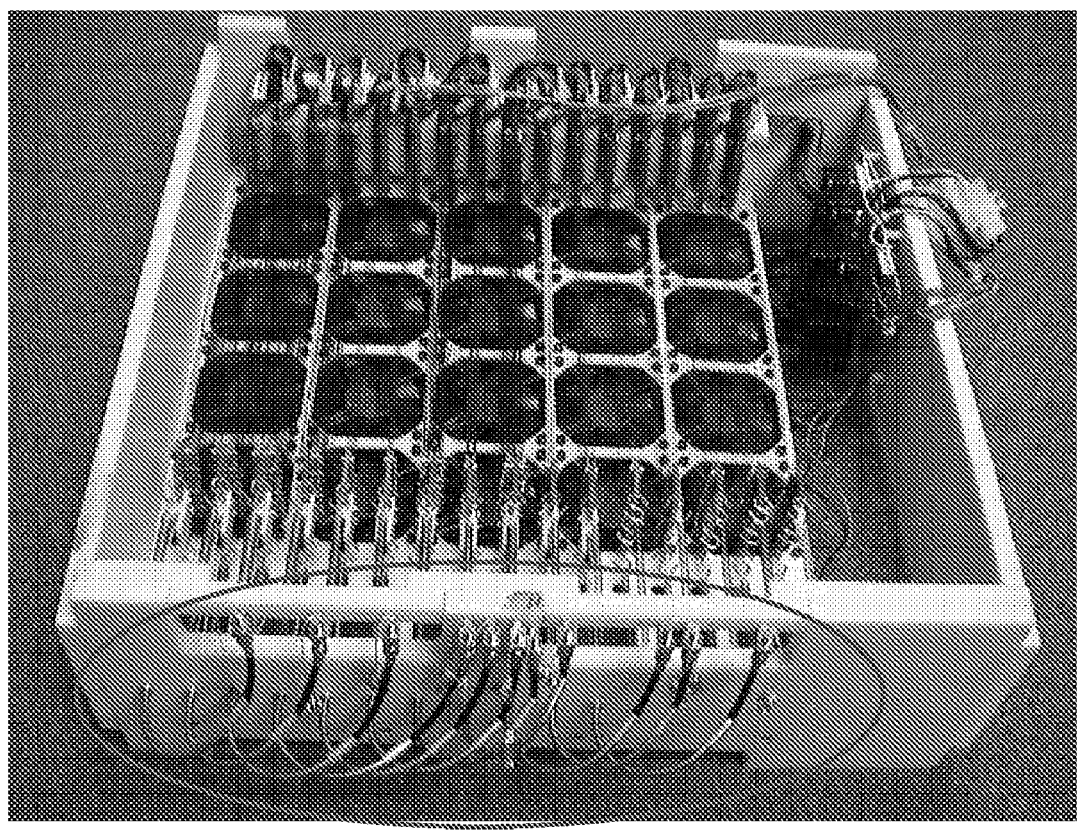
FIG. 18 is an image illustrating detail of the routing done by assembly of bicycle brake cable housings and noodles, in accordance with the invention.

FIG. 18 is an image illustrating detail of the routing done by assembly of bicycle brake cable housings and noodles. The Kevlar wires are contained in a cable housing that is inextensible, in order to ensure the perfect transmission of the displacement generated by the SMA wire.

Figure 19:
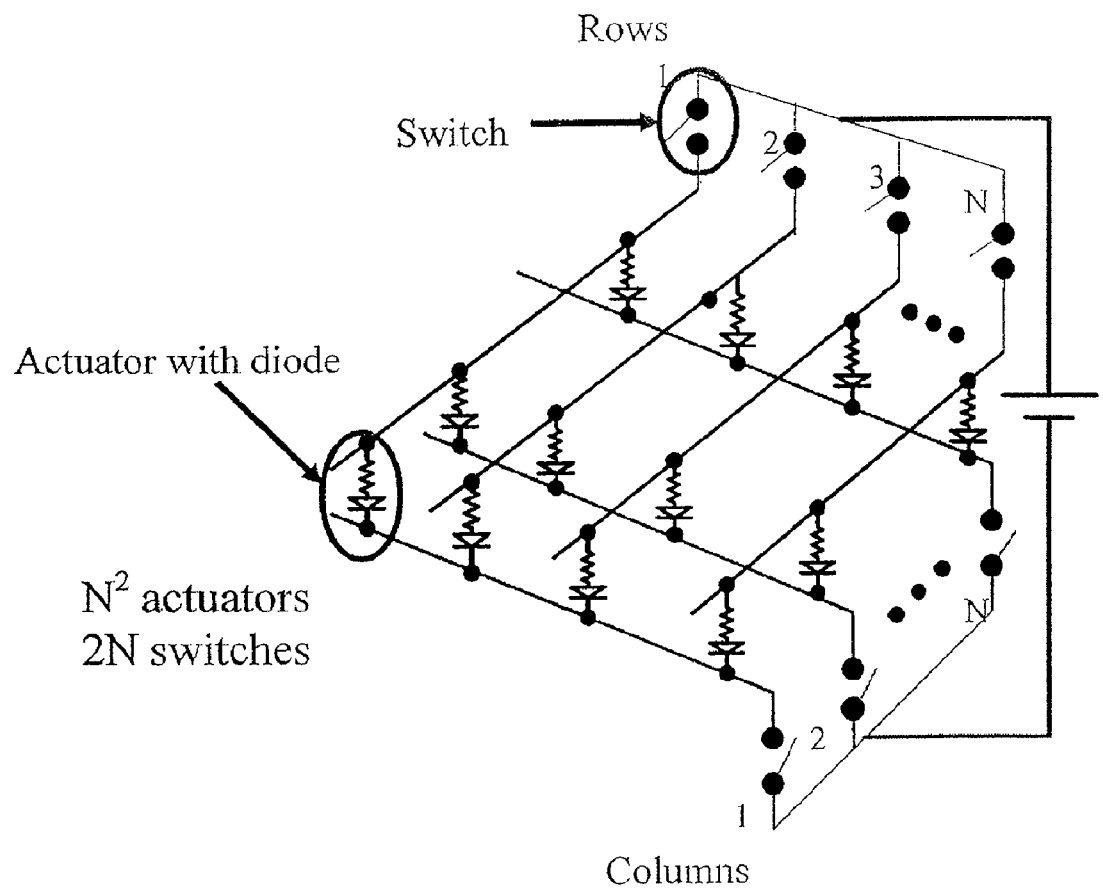
FIG. 19 is a schematic diagram illustrating the architecture of the matrix drive system in accordance with the invention.

In order to make the system more compact and efficient in terms of power related resources, in one embodiment, a matrix drive system is used. Wires and drive amplifiers are shared among the actuators, instead of having a dedicated wire and power amplifier for each actuator. FIG. 19 is a schematic diagram illustrating the architecture of the matrix drive system. Since the robotic car seat does not require all of the actuators to be turned on at the same time, it is reasonable to use a matrix drive architecture. 2N number of switches and wires are used to activate $N^2$ number of actuators. By activating the appropriate pair of switches in each column and each row of the matrix, one can turn on any actuator in the network at any instant. By turning on the switch for the $m^{th}$ row and the $n^{th}$ column, the actuator on the corresponding row and column, denoted $A_{mn}$, will be turned on. For example when both switches from the third row and the second column of the matrix are connected to the power source, only actuator $A_{32}$ will be turned on.

The wiring for the 16 SMA actuators for the actuator box 40 for the robotic car seat uses a matrix drive system. By using matrix drive system, the number of drive amplifiers was reduced to 8 from 16. The wiring was also simplified by connecting 8 wires onto each actuator and the drive circuitry connected to the nearest actuator, instead of 16 wires being connected one by one from each actuator to the drive circuitry. Although the actuators are not placed in matrix architecture, they are electrically connected in matrix architecture. The actuators are placed side by side, with 8 wires connecting all sixteen actuators from each actuator to another actuator, creating a daisy chain like structure. Four wires correspond to the row wires and the other four wires correspond to the column wires. Although they are physically connected to all the actuators, each actuator is electrically connected to one row wire and one column wire. For example, actuator $A_{12}$ is electrically connected to $1^{st}$ row wire and $2^{nd}$ nd column wire. So, by turning on the switch for row 1 and column 2, actuator $A_{12}$ will be activated.

Hence, an active control of the car seat surface, using SMA actuator units has been implemented. The actuator units are housed in a compact actuator box 40 under the car seat 11, and cables are used to transmit the force and displacements to the actuation points on the seat surface. The SMA actuator units are driven using a scalable matrix architecture, which uses 2N switches to drive $N^2$ actuator units.

Figure 20:
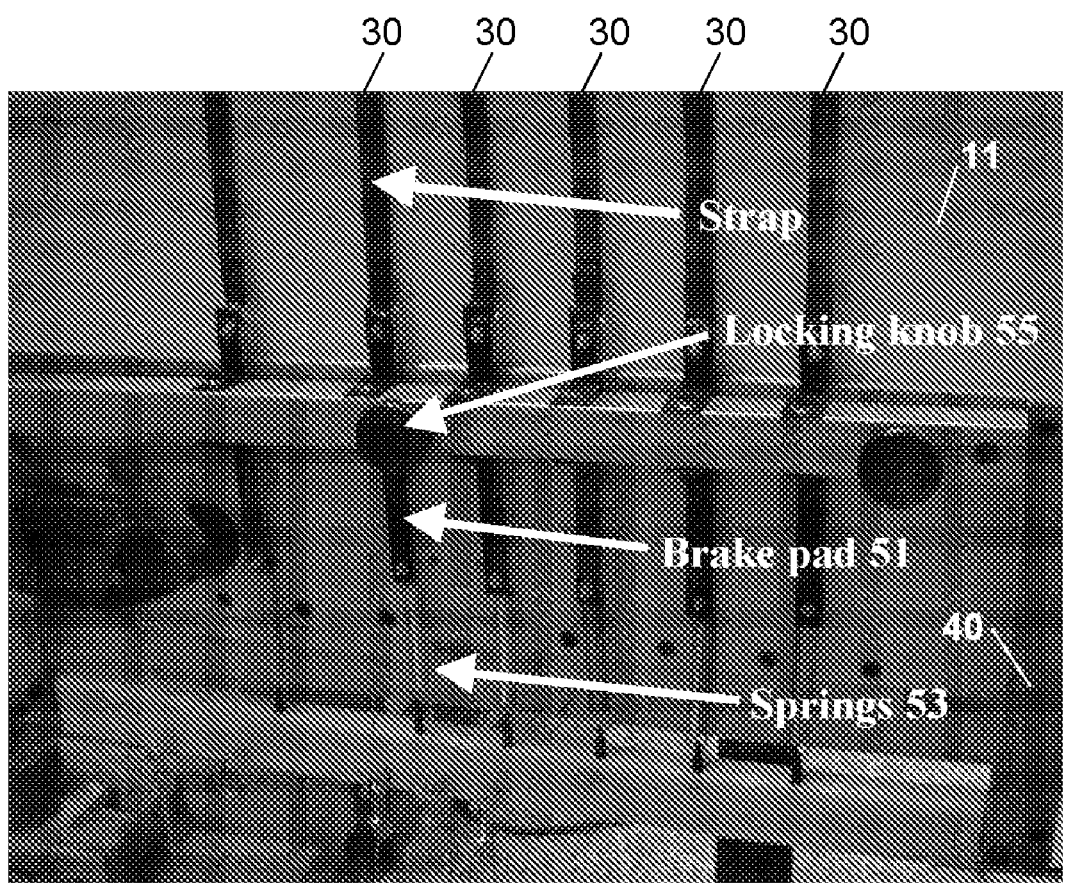
FIG. 20 contains an image of the locking mechanism used to eliminate slack in accordance with the invention.

According to the invention, actuation is done with a soft fabric, and the fabric is placed on a flexible cushion. The depth of the cushion change under loading of different person causes change of initial position of the actuator, causing slack in the actuator. Due to this slack, when the SMA wire is actuated, the displacement is used to reduce the slack, instead of being used to activate the fabric actuators. In order to eliminate this slack problem, a locking mechanism is used. FIG. 20 contains an image of the locking mechanism used to eliminate this slack. Each fabric actuator strap has a break pad 51 attached at the end, and the break pad is attached to a spring 53. The spring 53 is attached to a fixed frame. When a person sits on the seat, there will be a different displacement of all the fabric actuator straps. The locking bar is locked with a locking knob 55 after a person sits on the chair, providing a initial position of the fabric actuator straps 30 by fixing the one end without any slacks at the actuator end.

Figure 21:
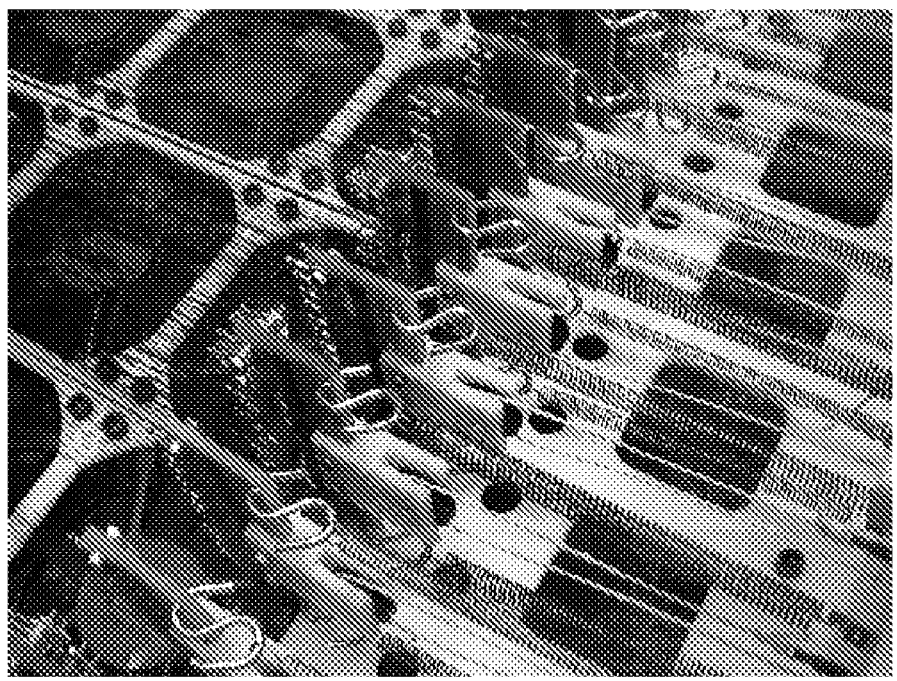
FIG. 21 is an image illustrating the use of pulleys to increase the displacement provided by the actuators, in accordance with the invention.

In one particular exemplary embodiment, the displacement of each actuator is 20 mm. This displacement is translated into upper lift motion and pulling down motion. In order to increase the displacement for larger pressurizing effect, pulleys are used. By using one more pulley per actuator, their displacement can be doubled, thereby increasing the displacement to 40 mm. FIG. 21 is an image illustrating the use of pulleys to increase the displacement provided by the actuators.

Figure 22:
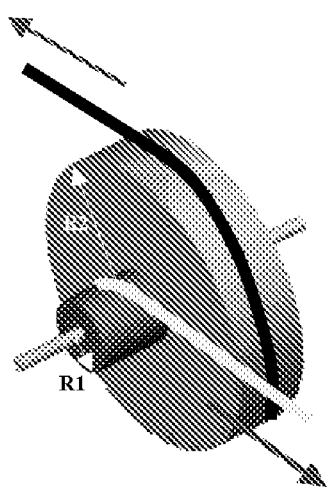
FIG. 22 is a schematic perspective view of a continuous pulley in accordance with an embodiment of the invention.

Another alternative is to use a continuous pulley. FIG. 22 is a schematic perspective view of a continuous pulley in accordance with an embodiment of the invention. By using a continuous pulley, the ratio of displacement increase can be controlled by changing the ratio of the diameter of the hub that each actuator passes by. For example by setting the ratio of R2 to R1 to be 3, displacement can be multiplied three times the displacement created by the actuator. This component creates larger displacement increase while using less space.

In one embodiment, the side bar is separate from the seat foam and are placed outside of the foam. Alternatively, the structure that supports the actuators can be incorporated inside the foam. The molding of the foam can be done with the structure included in the casting mold.

Figure 23:
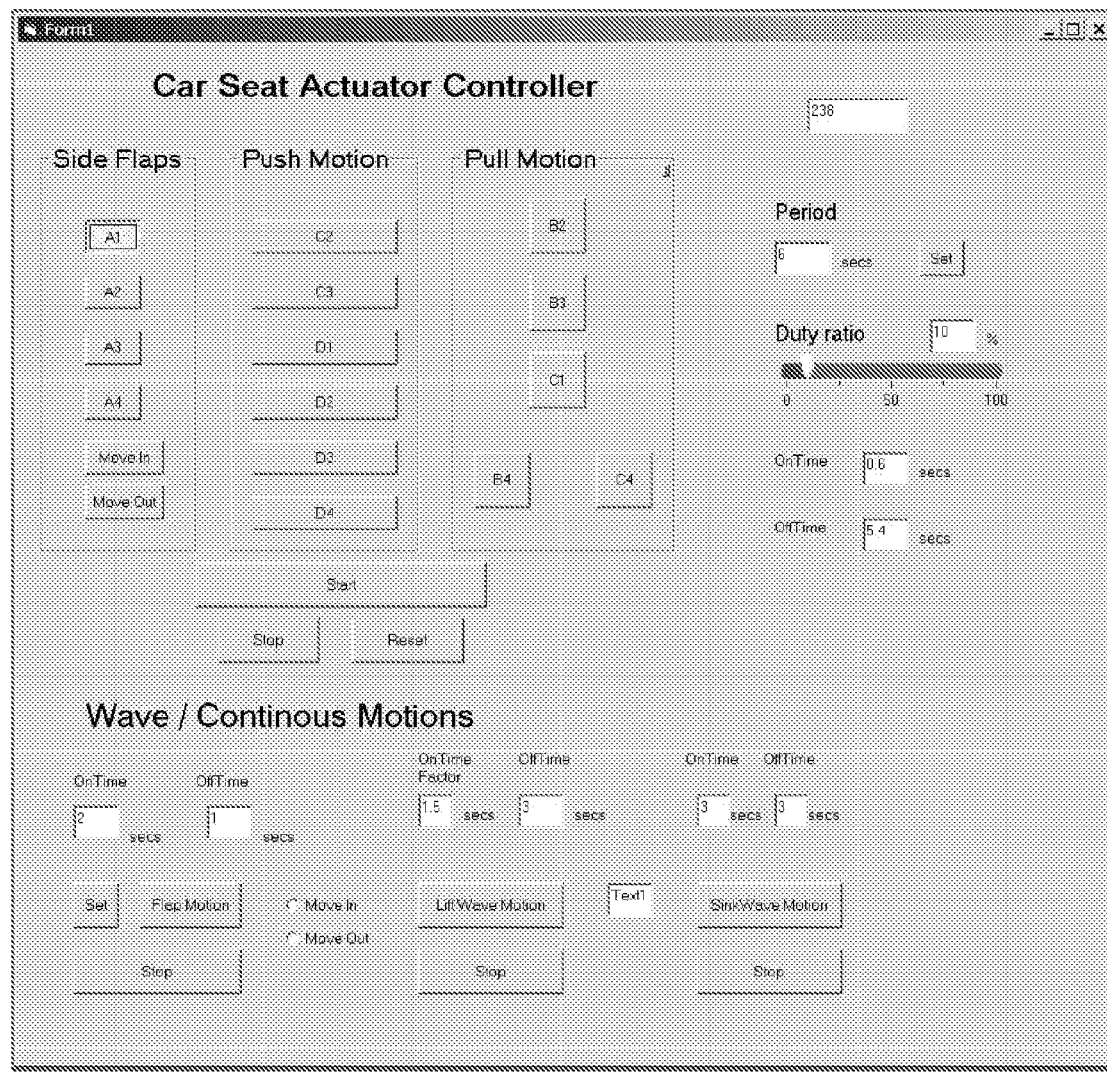
FIG. 23 is a view of the menu of the controller software according to the invention.

Software for controlling the car seat actuator was developed using Microsoft Visual Basic 6.0 and Measurement Studio for Visual Studio 6.0. FIG. 23 is a view of the menu of the controller software. In order to facilitate the experiment of the car seat actuator, there are two types of motions that can be created with the controller. In accordance with one illustrative exemplary embodiment, first, each actuator can be actuated separately by designating the actuator to be activated. Actuators A1 to A4 are designated for activating the Flap mechanism, and Actuators C2, C3 and D1 to D4 are designated for lifting motion, where D4 is the actuator closest to the front end of the chair, and C2 is the inner most actuator for lifting motion. Actuators B2, B3, C1 are the actuators for sinking motion placed at the center of the seat, and actuators B4 and C4 are actuators for sinking motion at the leg part, left and right respectively. The period of actuation can be determined by changing the value labeled period, and the duty ratio can be changed by sliding the Duty Ratio slide bar. Then, the On-time and Off-time of the actuator that was chosen is shown at the textboxes. After choosing the actuator and setting the On-time and Off-time, operation can be initiated by pressing "Start". The chosen actuator will be activated until the "Stop" button is pressed.

Three sets of continuous wave motions can also be created using the software. Flap motion can be created by checking the Move in or Move out button, and then Flap motion button. The On-time and Off-time can also be controlled. Continuous wave of lifting motion is created by pressing the lift wave motion button and setting the On-time factor and Off-time factor. Similarly, sinking wave motion is created by pressing the sink wave motion and setting the On-time and Off-time.

Figure 24:
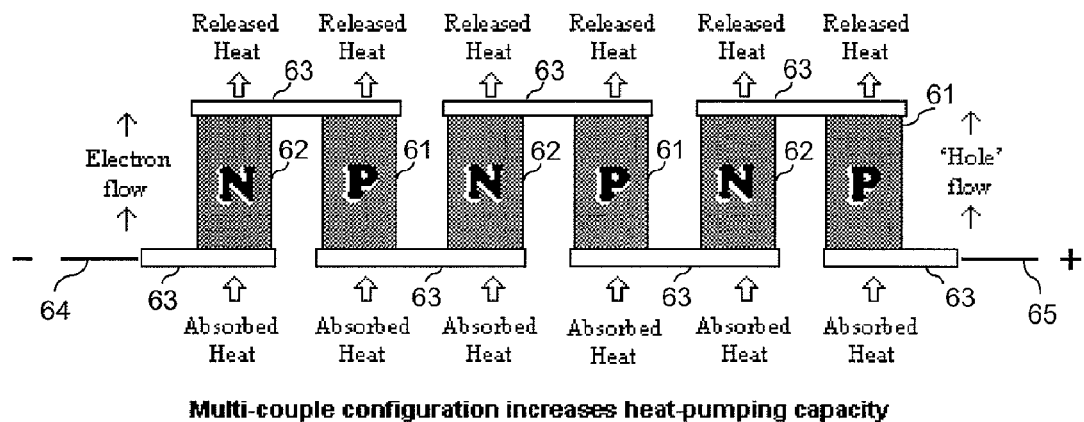
FIG. 24 contains a schematic diagram of a portion of the thermoelectric devices (TED) used in the integrated SMA/TED actuator devices of the invention.

FIG. 24 contains a schematic diagram of a portion of the thermoelectric devices (TED) used in the integrated SMA/TED actuator devices of the invention. The TEDs include multiple Peltier elements 61, 62 electrically connected in series by conductors 63. Each Peltier element includes a thermoelectric material which experiences heat flow in a particular direction upon application of an electrical current in a particular direction. In the invention, N-type Peltier elements 62 are connected in series in an alternating fashion with P-type elements 61. As indicated in FIG. 24, a voltage is applied across positive terminal 65 and negative terminal 64 of the illustrated exemplary device. As a result, electron current flows from negative terminal 64, through the Peltier elements 61, 62, to the positive terminal 65. Also, hole current flows from the positive terminal 65, through the elements 61, 62, to the negative terminal 64. As illustrated in the figure, in N-type Peltier material, heat flows in the direction of the electron current, and, in P-type Peltier material, heat flows in the direction of the hole current. As a result, with the applied voltage having the indicated polarity with regard to the terminals 64 and 65, heat is released at the top surface of the device, and heat is absorbed at the bottom surface of the device. Accordingly, the top surface has a higher temperature than the bottom surface. If the polarity of the voltage applied to terminals 64 and 65 is reversed, then the heat flows in the opposite direction, i.e., the top surface of the device is cooled, and the bottom surface is heated.

Figure 25:
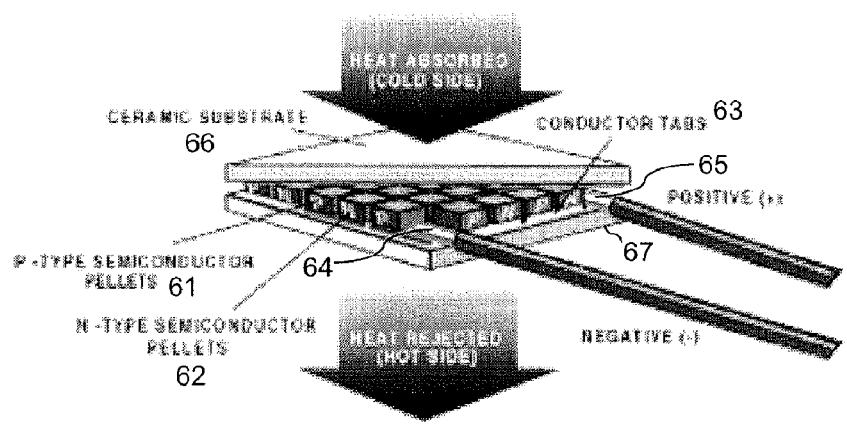
FIG. 25 contains a schematic diagram of a partially cut-away assembled thermoelectric device according to the invention.

FIG. 25 contains a schematic diagram of a partially cutaway assembled thermoelectric device. As shown in the figure, the device includes an array of both P-type (61) and N-type (62) Peltier "pellets" or elements connected together by conductors 63. An upper ceramic substrate 66 is formed over the device, and a lower ceramic substrate 67 is formed at the bottom side of the device.

As described above, the integrated SMA/TED actuator of the device uses TEDs or Peltier devices to apply heat to the shape memory alloy material of the SMA actuator to cause the material to change its shape and, as a result, provide the actuation motions used by the active car seat of the invention. A certain amount of heat is required to be transferred by the TED to provide the required temperature applied to the SMA actuator. In one embodiment, the single-axis SMA actuator should provide 700N of force and 12 mm of displacement. From these requirements, the mass of the SMA actuator can be calculated according to the following.

Area=Force/Maximum stress of $SMA$=700N/200 Mpa=3.5 mm$^2$

Length=Displacement/0.04=300 mm

Volume=Area*Length=1.05*10$^{-6}$ m$^3$

Mass($M_{SMA}$)=Volume*Density=1.05*10$^{-6}$*6450 kg=6.77 g

The heat needed to increase the temperature of the SMA up to 100° C. is calculated in accordance with the following.

−Heat=$C_p$*$\Delta T$*$M_{SMA}$+$\Delta h$*$M_{SMA}$

Cp: Specific heat=450 J/kg° C.

ΔT: temperature increase=75° C.

Δh: latent heat of transformation=32,000 J/kg

From these calculations, it is determined that to raise the temperature of the SMA actuator to 100° C., the heat required is given by $E_{SMA}$=356.4 J/axis.

Figure 26:
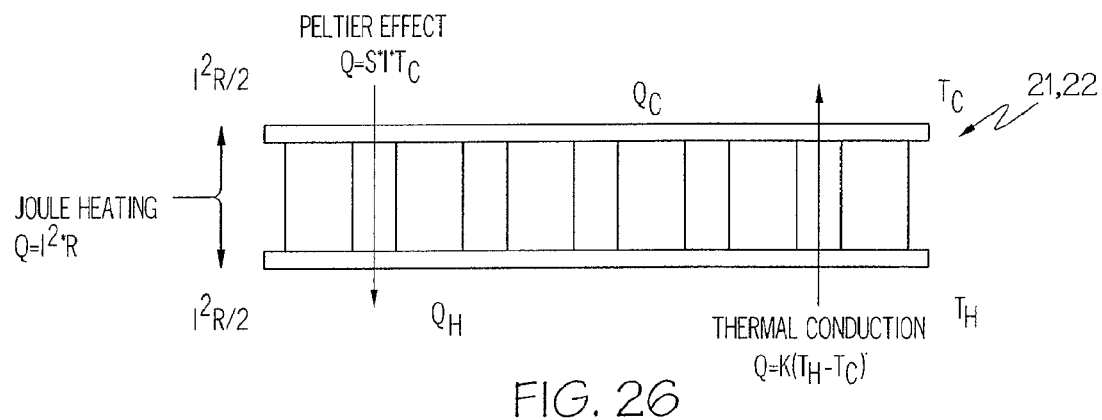
FIG. 26 contains a schematic diagram of one thermoelectric device in accordance with the invention.

FIG. 26 contains a schematic diagram of one thermoelectric device 21, 22 in accordance with the invention. The heat transfer calculations for the TED are in accordance with the following.

The rate of heat extracted from the cold side Qc is given by $$Q_C = S*I*T_C - I^2R/2 - (T_H-T_C)/\theta_{TED}$$

The rate of heat added to the hot side QH is given by $$Q_H = S*I*T_C + I^2R/2 - (T_H-T_C)/\theta_{TED}$$

In these equations,
R: electrical resistance of TED
I: current
S: Seebeck coefficient [Volts/Kelvin]
$S = S_m * 2N_c$
$N_c$: Number of p-n element pairs in TED
$S_m$: Material Seebeck coefficient
$S_m = S_0 + S_1*T + S_2*T$
$S_0 = 2.2224*10^{-5}$
$S_1 = 9.306*10^{-7}$
$S_2 = -9.905*10^{-7}$
$\theta_{TED}$: TED thermal resistance [Kelvin/Watts]

$$\theta_{TED} = \lambda/2K_mN_c$$

$\lambda = L/A$: Form factor
$K_m$: Material thermal conductivity [Watts/Kelvin*cm]

Figure 27:
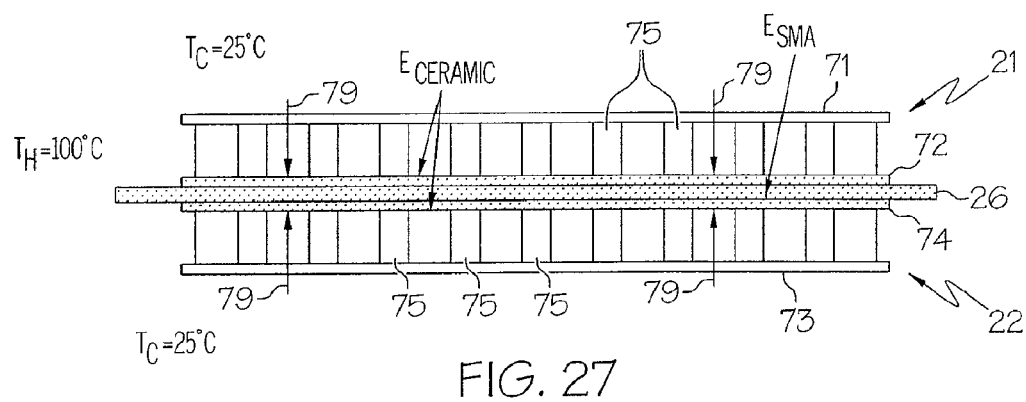
FIG. 27 contains a schematic diagram of an integrated SMA/TED actuator in accordance with the invention.

FIG. 27 contains a schematic diagram of an integrated SMA/TED actuator in accordance with the invention. As illustrated in the figure, the device includes an upper thermoelectric device 21 and a lower thermoelectric device 22. The TEDs 21 and 22 are positioned facing each other with the shape memory alloy (SMA) actuator wire 26 disposed between them. Heat is applied to the SMA actuator 26 by the TEDs to change it length to provide the actuation motion. As illustrated by arrows 79, both TEDs 21 and 22 are biased to provide heat flow toward their inner surfaces 72, 74 and away from their outer surfaces 71, 73, respectively. As a result, heat is applied to the SMA actuator 26 to change its length and provide the required pulling motion. In one embodiment, at least the inner surfaces 72 and 74 of the TEDs 21, 22, respectively, are made of a ceramic material.

In one embodiment, the SMA actuator wire is about 7 mm by 300 mm. In one embodiment, this calls for a TED to be 10 mm by 300 mm is size.

The total heat needed $E_{needed}$ is given by $$E_{needed} = E_{SMA} + E_{ceramic} + E_{miscellaneous} = (1156.4\alpha)J$$

In this equation,
$E_{ESMA}$: Heat needed for activating the SMA=356.4 J
$E_{ceramic}$: Heat needed to increase the temperature of the ceramic plate of the TED=800 J
$E_{miscellaneous}$: Other heat losses (through side openings, etc.)

Figure 28:
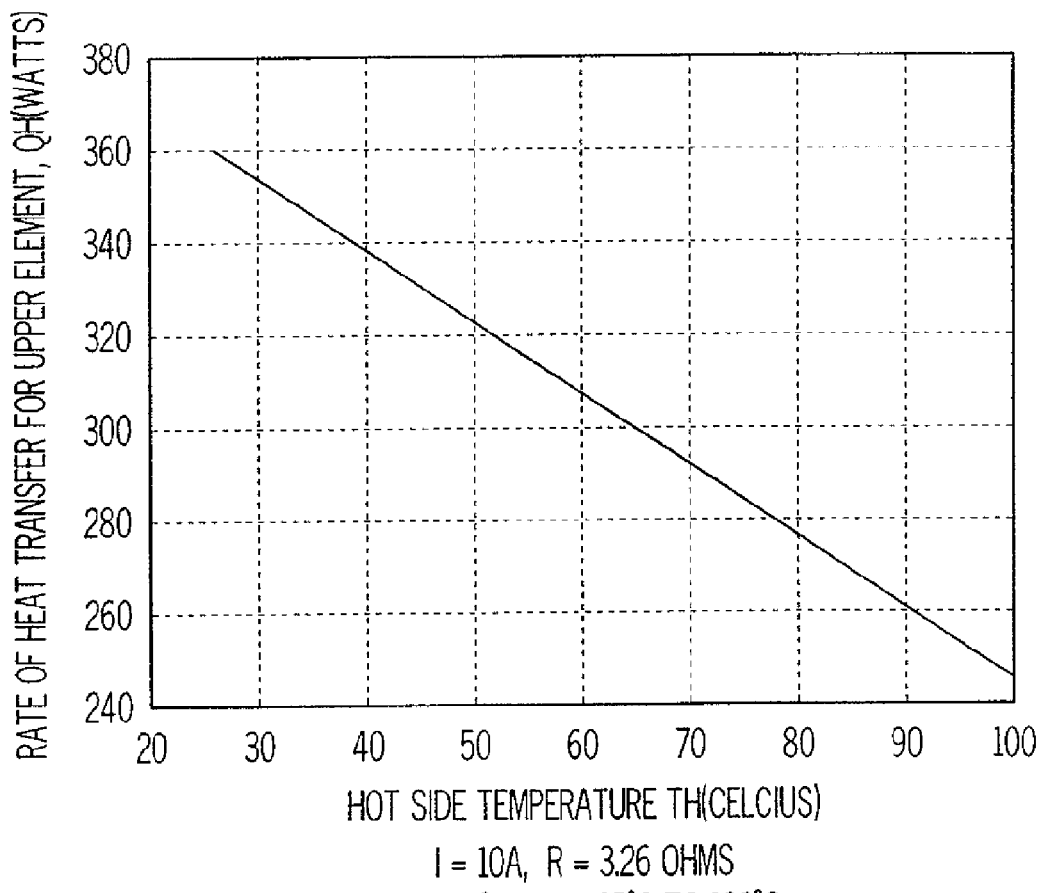
FIG. 28 is a graph of the rate of heat added to the hot side of a TED versus hot side temperature according to the invention.

FIG. 28 is a graph of the rate of heat added to the hot side $Q_H$ versus hot side temperature with I=10 A, R=3.26 ohms, $T_C$=25° C. and $T_H$=25° C. to 100° C. The rate of heat depends on temperature, and $T_H$ increases from 25° C. to 100° C., and $T_C$ is assumed to be constant at 25° C. Since the SMA actuator is sandwiched between two elements, the total heat transfer rate is twice the calculated value. In one embodiment, the average $Q_H$ is about 600 Watts.

Figure 29:
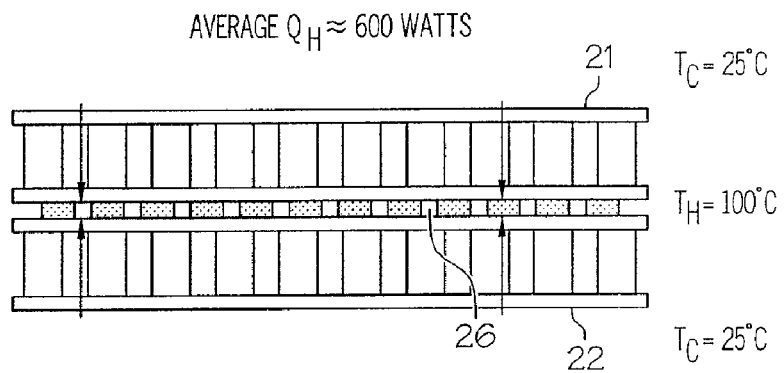
FIG. 29 is a schematic diagram of the integrated SMA/TED actuator device of the invention in the actuation mode.

FIG. 29 is a schematic diagram of the integrated SMA/TED actuator device of the invention in the actuation mode. As illustrated by the arrows, in the actuation mode, both TEDs 21 and 22 are biased to transfer heat toward their inner surfaces, where the SMA actuator wire 26 is located. As a result, the SMA actuator 26 is heated and changes shape. As illustrated, the cold temperature at the outer surfaces of the TEDs 21, 22 is about 25° C., and the hot temperature at the inner surfaces of both TEDs is about 100° C. Because heat flows from both TEDs 21, 22 toward the SMA actuator 26, the temperature of the actuator 26 is sufficiently high, e.g., 100° C., to cause the SMA actuator 26 to change shape and create the desired actuation motion.

Figure 30:
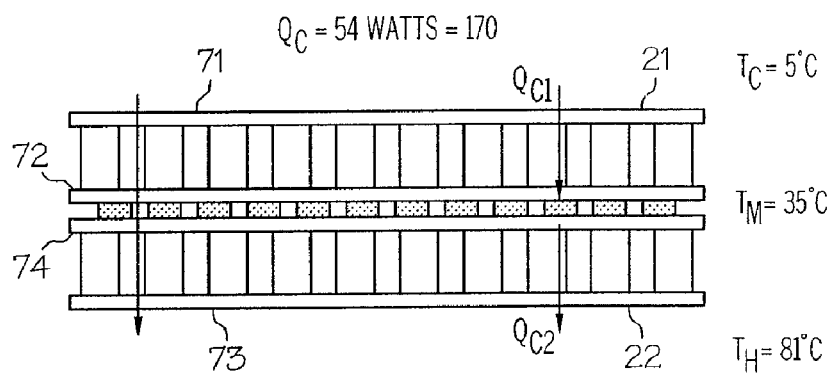
FIG. 30 is a schematic diagram of the integrated SMA/TED actuator device of the invention in the rapid cooling mode.

FIG. 30 is a schematic diagram of the integrated SMA/TED actuator device of the invention in the rapid cooling mode. As shown in the figure, in the rapid cooling mode, both TEDs 21 and 22 are biased to cause heat flow from their top surfaces 71, 74 to their bottom surfaces 72, 73. The result is a total net flow of heat away from the top surface of the device, to cool the seat 11. As a result, the temperature at the top surface 71 of the device is about 5° C., the temperature in the middle of the device is about 35° C., and the temperature at the bottom surface 73 of the device is about 81° C. Thus, with both TEDs biased to flow heat toward the bottom of the device, rapid cooling is realized.

As noted above, the rate of heat extracted from the cold side is given by $$Q_C = S*I*T_C - I^2R/2 - (T_H-T_C)/\theta_{TED}$$

Referring to FIG. 30, QC1, the heat extracted from the cold side 71 in TED 21, is given by $$Q_{C1} = S*I*T_C - I^2R/2 - (T_M-T_C)/\theta_{TED}$$

And the heat extracted from the cold side 74 in TED 22 is given by $$Q_{C2} = S*I*T_M - I^2R/2 - (T_H-T_M)/\theta_{TED}$$

$$Q_{C1} = Q_{C2}$$

Since $Q_C$ is dependent on $T_H$ an $T_C$, temperature difference of $T_C$ and $T_M$ is not equal to the temperature difference of $T_M$ and $T_H$. For I=5 A, about 54 Watts=170 Btu/hour of cooling power can be achieved with a single axis.

As shown in FIG. 30, heat flows in TED 21 toward the SMA actuator 26, but, heat flows in the TED 22 away from the SMA actuator 26. This results in the temperature at the actuator 26 being at some intermediate level, e.g., 35° C. Because this intermediate temperature at the actuator 26 is relatively low, the actuator 26 does not change shape, and no actuation motion is produced. Hence, in accordance with the invention, in the cooling mode, no actuation motion takes place.

Figure 31:
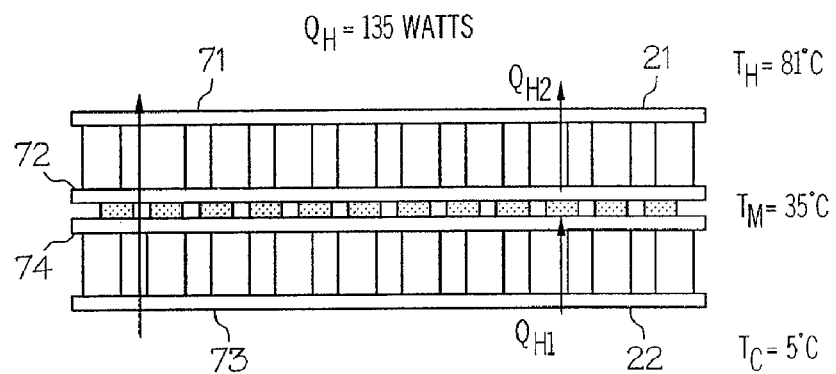
FIG. 31 is a schematic diagram of the integrated SMA/TED actuator device of the invention in the heating mode.

FIG. 31 is a schematic diagram of the integrated SMA/TED actuator device of the invention in the heating mode. As shown in the figure, in the heating mode, both TEDs 21 and 22 are biased to cause heat flow from their bottom surfaces 72, 73 to their top surfaces 71, 74. The result is a total net flow of heat toward the top surface of the device, to heat the seat 11. As a result, the temperature at the top surface 71 of the device is about 81° C., the temperature in the middle of the device is about 35° C., and the temperature at the bottom surface 73 of the device is about 5° C. Thus, with both TEDs biased to flow heat toward the top of the device, heating is realized.

As noted above, the rate of heat added to the hot side is given by $$Q_H = S*I*T_C + I^2R/2 - (T_H-T_C)/\theta_{TED}$$

Referring to FIG. 31, $Q_{H1}$, the heat added to the hot side 74 in TED 22, is given by $$Q_{H1}=S*I*T_C+I^2R/2-(T_M-T_C)/\theta_{TED}$$

And the heat added to the hot side 71 in TED 21 is given by $$Q_{H2}=S*I*T_M+I^2R/2-(T_H-T_M)/\theta_{TED}$$

$$Q_{H1}=Q_{H2}$$

For I=5 A, about 135 Watts of heating power can be achieved with a single axis.

As shown in FIG. 31, heat flows in TED 22 toward the SMA actuator 26, but, heat flows in the TED 21 away from the SMA actuator 26. This results in the temperature at the actuator 26 being at some intermediate level, e.g., 35° C. Because this intermediate temperature at the actuator 26 is relatively low, the actuator 26 does not change shape, and no actuation motion is produced. Hence, in accordance with the invention, in the heating mode, no actuation motion takes place.

Car manufacturers are increasingly interested in adding functionality to all components of luxury cars. This includes high-end car seats. Some of the desired features include temperature control and massaging ability. The present invention is also directed to a car seat that provides these capabilities. An integrated system of (1) thermoelectric devices to control seat surface temperature and (2) temperature innervated material actuators to provide actuation is described. The contraction of the material actuator is translated to a displacement of the seat surface through a mechanism that fits within the confines of a car seat. The layout of these actuators is also described. Seat surface temperature is controlled by direct conductive cooling or heating from peltier TEDs.

SMA actuators can produce the highest energy density among all actuator materials currently available. However, SMA is difficult to control due to hysteresis and slow dynamics, in particular, due to slow cooling behavior. Using Peltier-effect TEDs for thermally controlling SMA yields improved performance over natural and forced air cooling (B. Selden, K. Cho, H. Asada, Multi-Segment State Coordination for Reducing Latency Time of Shape Memory Alloy Actuator Systems. Proceedings of the 2005 IEEE International Conference on Robotics and Automation (hereinafter Selden, et al.), and M. Thrasher, A. Shahin, P. Meckl, J. Dones, Efficiency Analysis of Shape Memory Alloy Actuatorrs. Smart Mater, Struct. 3 (1994) pp 226-234., incorporated herein by reference). Furthermore, integrating TEDs with SMA makes the system compact and reliable and thereby usable for various applications.

The invention of the TED/SMA system is for an advanced car seat. In one embodiment, the thermo-mechanical system is embedded in the driver seat to provide thermal comfort as well as massaging. An array of bi-layer TEDs beneath the seat fabric is capable of rapid cooling in hot environments, i.e., in the summer, and rapid heating in those that are cold, i.e., in the winter. SMA wires placed between two layers of TEDs are thermally activated to generate periodic waves that act as a massaging motion for massaging the driver to alleviate fatigue due to long touring. Furthermore, the temperature of the seat surface is regulated simultaneously with the massaging operation. Therefore, the system is multifunctional with multiple goals simultaneously satisfied.

The invention is directed to the thermo-mechanical system and an approach using the mechanical system to create a massaging motion and to the thermal system to provide the desired temperature control. A control approach, an iterative learning control used to control motion, is also described.

In order to improve comfort, the car seat provides rapid heating and cooling. Currently, conventional car temperature control systems respond slowly, especially from startup. On extremely cold days, the car cannot heat up its interior until the motor has warmed. On hot days, the air conditioner must pump air into the cabin for a significant amount of time until the passenger is comfortable. The seat of this invention is designed such that it is able to quickly deliver or remove heat directly from the passenger, regardless of the state of the rest of the car.

In addition to this rapid temperature control, the seat performs a massaging motion. This massaging motion can help to relieve tension and reduce fatigue during long drives by improving blood circulation. The crucial requirement for this massaging motion is the coordination between actuators that can provide a smooth propagating wave along the length of the seat.

Figure 32:
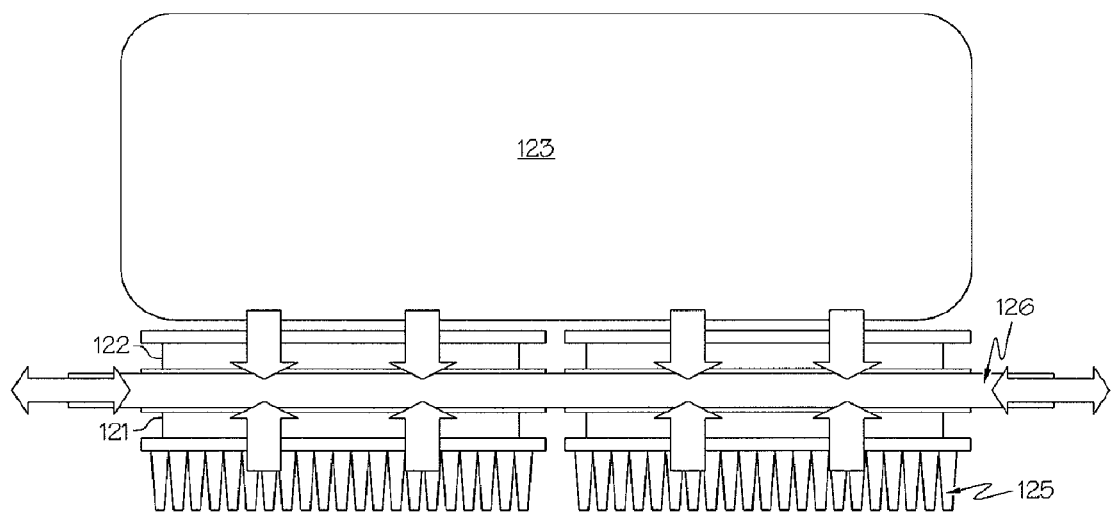
FIG. 32 is a schematic diagram of an integrated SMA/TED thermo-mechanical system in accordance with an embodiment of the present invention.

FIG. 32 is a schematic diagram of an integrated SMA/TED thermo-mechanical system in accordance with an embodiment of the present invention. FIG. 32 illustrates the arrangement of the bilayer of peltier TEDs 121 and 122, the SMA wire 126 between the peltier TEDs 121 and 122, i.e., sandwiched inside, a body 123, and a heat sink 125. The sandwich of peltier TEDs 121 and 122 allows the direct delivery of heat to the SMA wire 126. By controlling the temperature of the SMA wire 126, it is possible to control its displacement. Shape memory alloys have the property that when heated through a phase transition, they deform. In the case of SMA wires, the deformation is manifested by a contraction (when heated from martensite to austenite) or a relaxation (when cooled from austenite to martensite). The SMA wires 126 in this system are heated and cooled using the same peltier TEDs 121 and 122 that heat and cool the seat surface. The two peltier TEDs 121 and 122 sandwich a section of SMA wire 126 and control its contraction. They are also responsible for maintaining the temperature of a small section of the seat surface.

Figure 33:
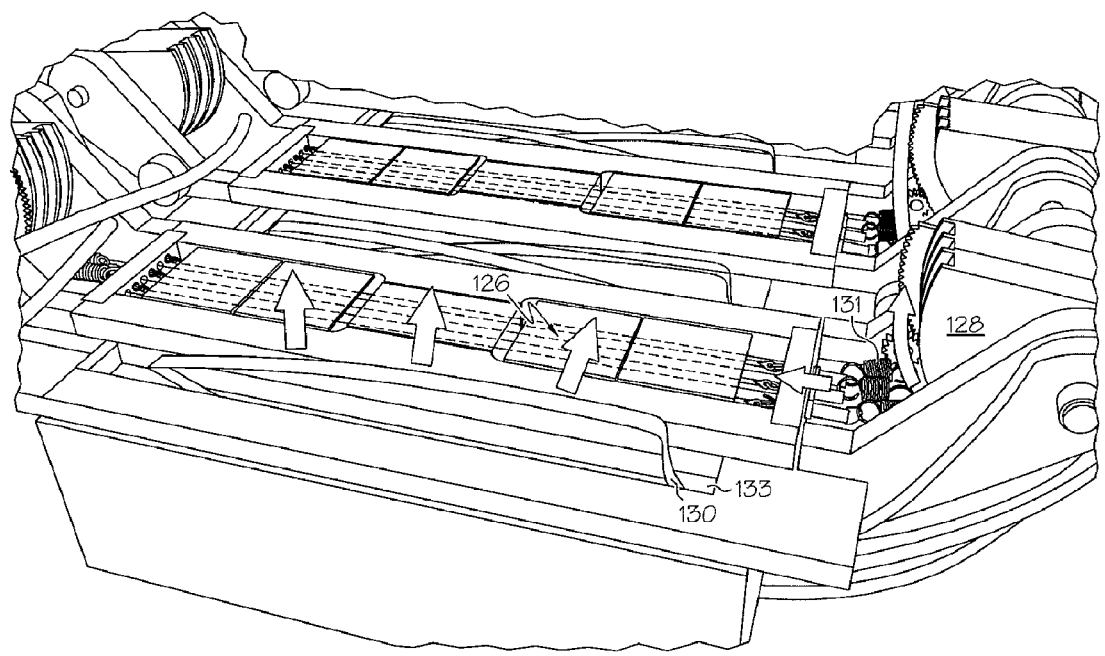
FIG. 33 comprises an image of detailed hardware used in the actuator box of the invention according to an embodiment of the invention.

FIG. 33 comprises an image of detailed hardware used in the actuator box of the invention. The displacement of the SMA wire is translated through a pulley 128. Specifically, the contraction of the SMA wire causes a rotation of the pulley 128. A lever 130 is rigidly attached to the pulley 128 that moves up and down as the pulley 128 rotates. This up and down motion causes a displacement in the seat fabric. This is felt by a passenger on the seat as a change in pressure along the thighs.

In FIG. 33, six SMA wires are used per axis. Each axis is connected to two levers 130, which means that each lever 130 is actuated by three SMA wires 126 in parallel. A large number of SMA wires could be included because of the large surface area of the peltier TEDs. Springs 131 are included in the connection point between the SMA wires 126 and the pulley 128. This ensures that all SMA wires 126 are able to exert force even in the presence of small alignment errors.

The displacement of the levers 130 is sensed with a potentiometer that turns along with the pulley 128. This potentiometer is mounted in the same delrin bearing that holds the pulley 128. Slits 133 of FIG. 33 are shown cut into the surface on which the TEDs are mounted. These slits 133 are small enough to allow the levers 130 to slide up and depress the seat surface. The surface of the seat is nearly flush: the TEDs are flush with the polycarbonate frame and a spacer fills in the gap between TEDs, while still allowing the bundle of SMA wires 126 to pass unimpeded.

Figure 34:
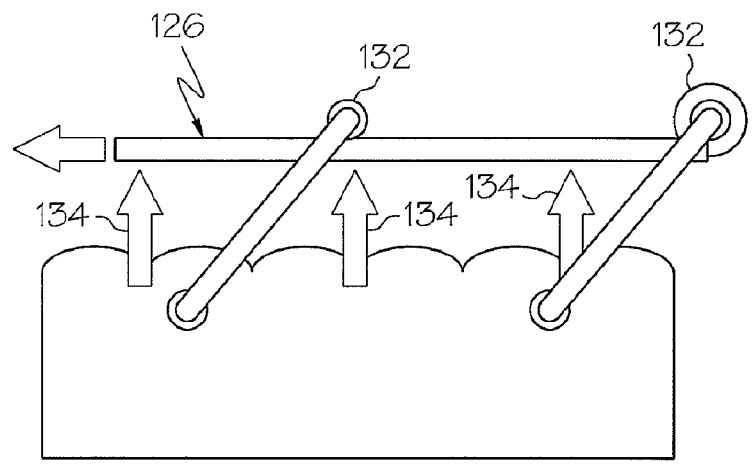
FIG. 34 contains a schematic diagram illustrating the contraction of an SMA wire according to an embodiment of the invention.

FIG. 34 contains a schematic diagram illustrating the contraction of an SMA wire 126 according to an embodiment of the invention. The contraction of the SMA wires 126 is transformed through a 4-bar mechanism including pivots 132 into an upward force 134.

Figure 35A:
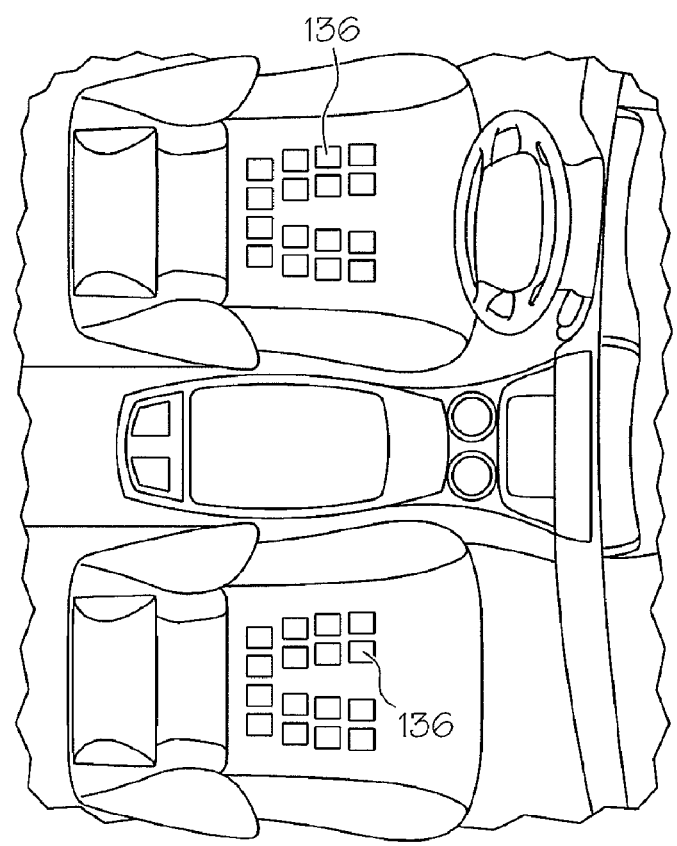
FIG. 35A is an image illustrating the integrated SMA/TED thermo-mechanical system installed in car seats, in accordance with the invention.
Figure 35B:
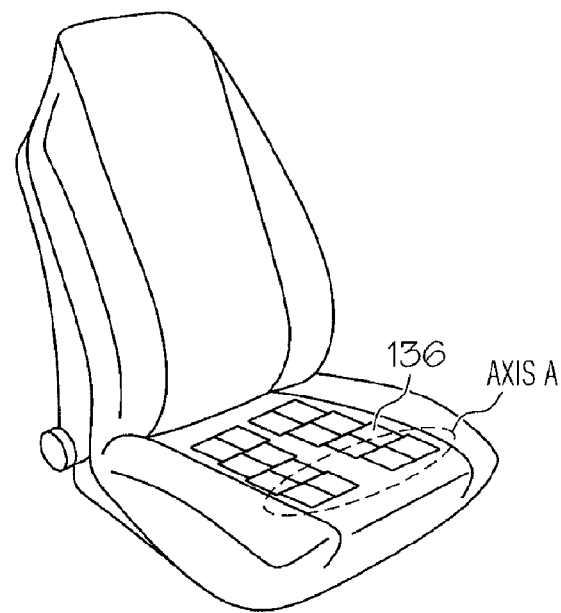
FIG. 35B is a schematic diagram of a car seat of FIG. 35A
Figure 35C:
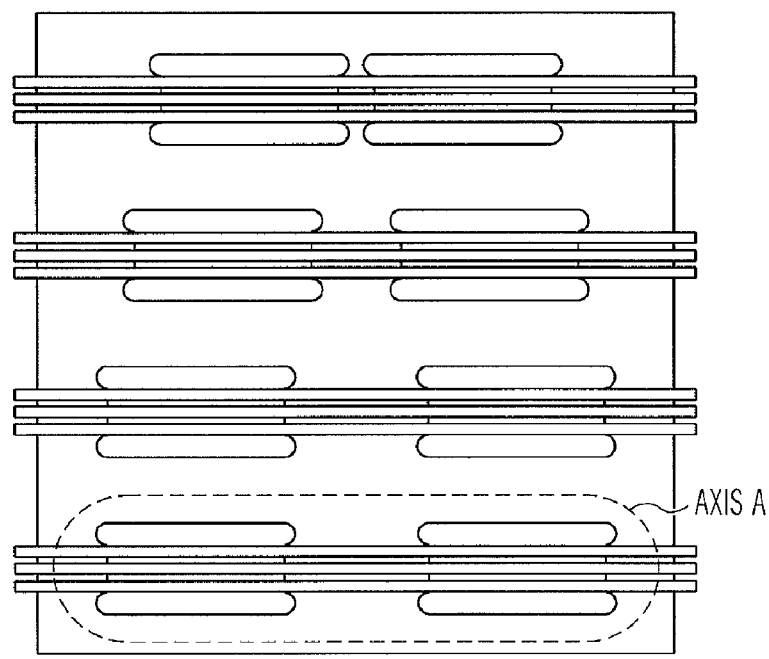
FIG. 35C is a detailed view of an axis A of the integrated SMA/TED thermo-mechanical system.

FIG. 35A is an image illustrating the integrated SMA/TED thermo-mechanical system installed in car seats, in accordance with the invention. FIG. 35B is a schematic diagram of a car seat of FIG. 35A and FIG. 35C is a detailed view of an axis A of the car seat of FIG. 35B. In FIGS. 35A, 35B and 35C, the actuators 136 are arranged in rows. This allows for the creation of a propagating wave motion by sequentially activating neighboring actuators 136. It is possible to create nearly arbitrary wave motion if each neighboring actuator 136 undergoes a trajectory that is phase shifted from its neighbor. This is limited by the spacing of the actuators and their total allowable stroke. The thermal elements remain close enough to the seat so that they can effectively deliver or remove heat. Only the top layer of TEDs is shown in FIGS. 35A, 35B and 35C. In fact, the architecture of FIGS. 35A, 35B and 35C includes two layers of TEDs. When stacked in this manner, each pair of TEDs is effectively two devices acting in series. This allows them to pump enough heat to meet the functional requirements.

The layout of the TEDs is tapered towards the rear of the seat and more spread out towards the front. This allows for the thermal elements to stay in close contact with the passenger's thighs. Each axis still has exactly eight thermal elements (four elements in a row on the top and the bottom), so the total possible contraction of the SMA wires is consistent across the seat. FIG. 35C is a detailed view of a single axis A of the car seat of FIG. 35B. The actuators are arranged in rows, because each row of TEDs is associated with a single SMA wire, and therefore a single massaging element. Four separate massaging element rows are pictured in FIGS. 35A, 35B and 35C. However, this number is largely dependent on the size of the TEDs used. The upward force element provided by each actuator runs parallel with the row of TEDs (and SMA wire) used in its actuation. The contraction of the SMA wire from its martensite state is a percentage of the length of wire in the austenite state. That is, if 20 cm of SMA heated into the austenite phase caused a contraction of 1 cm, then 40 cm of SMA heated into the austenite phase would cause a contraction of 2 cm under the same load (Selden, et al.). This means that the number of peltier TEDs heating the SMA wire into its austenite phase controls the contraction of the wire, and thus the upward force of the massaging element.

SMA wires are convenient because they are very compact, can exert high forces, and can be actuated by the same heating elements controlling the seat temperature. However, there are some shortcomings to this technology. Controlling these SMA wire actuators is difficult. Their displacement profile exhibits significant hysteresis. The temperature vs. displacement profile of the SMA wire is dependent on the applied load. The stress applied to each actuator (the weight on that part of the seat) affects the characteristic curve. Thus, the outputs of the actuators will depend on the weight of the person in the seat and the distribution of that weight. In order to compensate for this nonlinearity and reduce error due to this disturbance, the present invention utilizes an iterative learning approach. This approach works by observing the error present in each trial and iteratively updating its input in order to reduce this error. In order to best determine the appropriate control methodology for this system, it is important to model all of its components. The heat transfer mechanism in a single peltier TED has been fairly well modeled (T. Field et all; Massage Therapy Reduces Anxiety and Enhances EEG Pattern of Alertness and Math Computations. Int J Neurosci. 1996 September; 86(3-4): 197-205., incorporated herein by reference). There are three principle methods of heat transfer.

Figure 36:
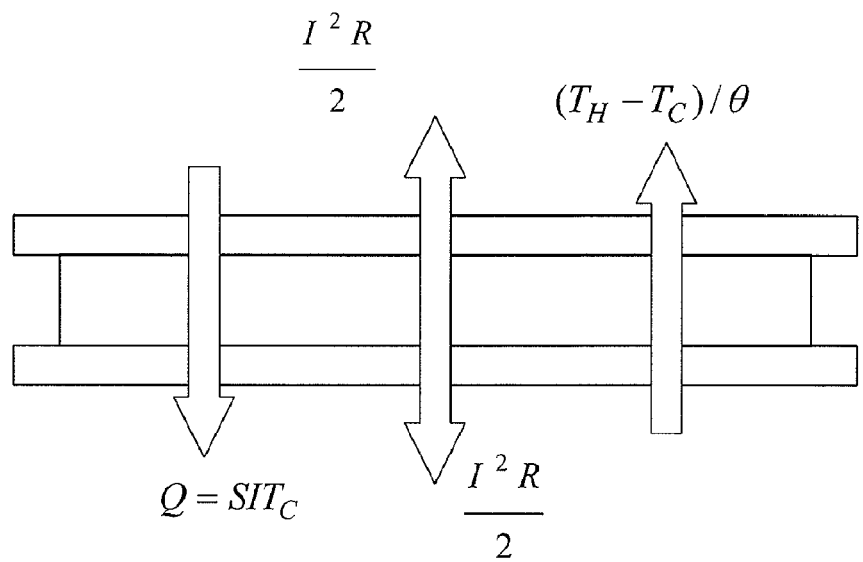
FIG. 36 contains a schematic diagram of modes of heat transfer in a one peltier thermoelectric device in accordance with the invention.

The driving force behind the peltier element is the heat flux created by the peltier effect due to an applied current. This heat is pumped from one ceramic surface to the other. The magnitude of this heat flux is proportional to the applied current. The current applied to the peltier TED is often substantial (on the order of several amps) and therefore produces a significant joule heating effect. This second form of heat transfer is dumped to both sides of the device. The peltier effect creates a temperature gradient across the device. A third form of heat transfer is due to simple thermal conductivity across this temperature gradient, as described by Fourier's law. FIG. 36 contains a schematic diagram of modes of heat transfer in one peltier thermoelectric device in accordance with the invention. In FIG. 36 the modes of heat transfer from left to right are peltier effect ($Q=SIT_c$), joule heating ($I^2R/2$), and thermal conductivity (($T_H-T_c$)/θ).

Figure 37:
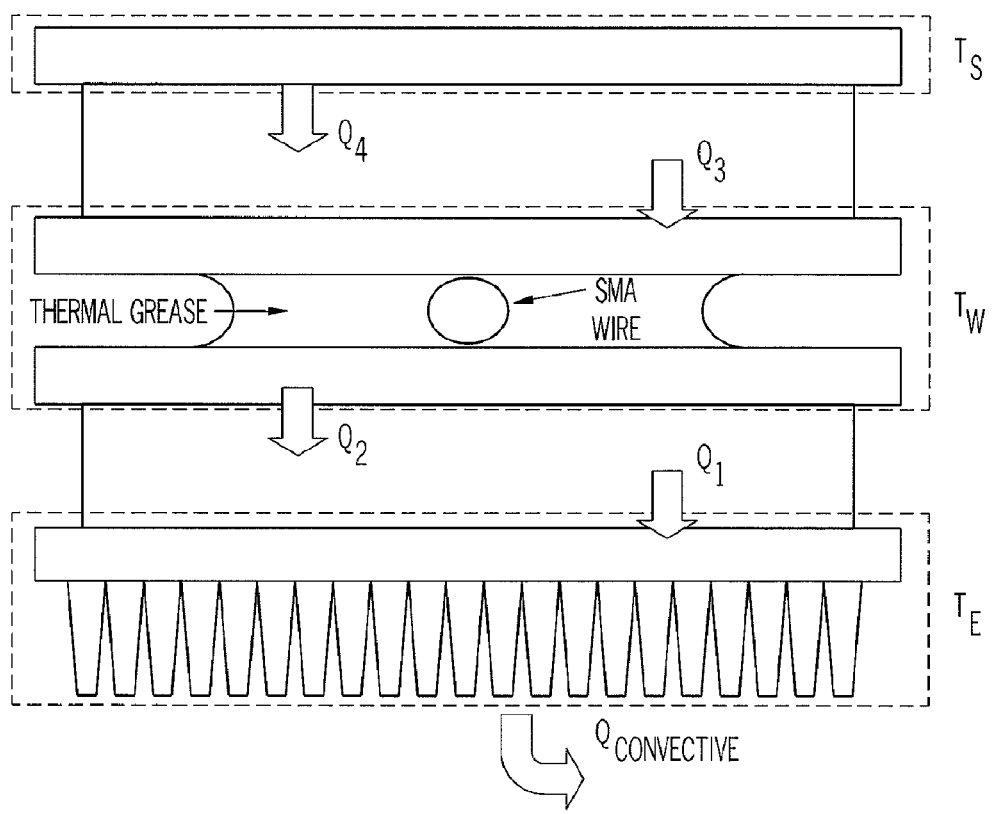
FIG. 37 contains a schematic diagram of control volumes that represent system state along with heat flux (Q) at each boundary region in accordance with the invention.

In the present invention peltier TEDs sandwich the SMA wire. FIG. 37 contains a schematic diagram of control volumes that represent system state along with heat flux (Q) at each boundary region in accordance with the invention. The module is divided into three control volumes. The assumption is made that each control volume is isothermal. This way, they can be treated as purely capacitive elements. Each peltier TED includes a middle region that is responsible for pumping heat sandwiched by two slabs of ceramic. $T_E$ is the temperature of the heat exchanger and bottom ceramic. It is the temperature of the control volume which exchanges heat with the ambient environment. In addition, the peltier TED provides some heat flux into the element. $T_w$ represents the ceramics surrounding the wire and the wire itself. The isothermal assumption can be justified here because of the liberal application of thermal grease around the wire. This control volume is directly influenced by both peltier TEDs. The top ceramic layer is modeled as being insulated on one side and directly driven by only the top peltier TED. The temperature of this control volume represents the temperature of the seat surface. These temperatures, $T_W$, $T_S$, and $T_E$ are the state variables of the system. The inputs to the system are the current used to drive the peltier TEDs, $I_1$ and $I_2$. The heat pump element in the middle of each peltier TED is modeled as a thermal resistance with some ability to produce and pump heat. It is assumed to be non capacitive.

In the following equations, $$S=S_m 2N_C$$

$S_m$—material Seebeck coefficient $N_C$—number of p-n element pairs $$\theta_{TEC} = \frac{\lambda}{2K_m N_C}$$

$\lambda$=L/A (element length/element area)

$K_m$—material thermal conductivity

A direction for sign convention is determined. For example, the positive current corresponds to heating the chair (cooling the heat sink). Each section is analyzed independently.

To find net Q into heat sink h($T_\infty-T_E$) is the heat lost to (or gained from) ambient temperature, where h is the convective heat transfer coefficient of the heat sink.

That expression is combined with the heat from the peltier TED to get heat equations. Note that it is important to separate this into two cases. The heat pumped by the peltier TED is dependent on the temperature of the cold side of the element. Thus, the two cases must be looked at separately. In the first case, $T_E$ is the cold side temperature, in the second case $T_W$ is the cold side temperature.

The case where the wire is being heated from both sides is described. Finding state equations for other modes of heating will follow a similar procedure. First, the next heat flux into the heat exchanger needs to be determined. This is the sum of the previously discussed forms of heat transfer, along with convective heat loss to the environment.

$$q_E = -SI_1T_E + \frac{I_1^2 R}{2} - (T_E - T_W)/\theta + h(T_\infty - T_E) \quad (2)$$

Next, the net heat flux into the center section is determined.

$$q_W = SI_1 T_E - SI_2 T_S + \frac{(I_1^2 + I_2^2)R}{2} - \frac{(T_W - T_E) + (T_W - T_S)}{\theta} \quad (3)$$

And finally, the surface section $$q_S = SI_2 T_S + \frac{I_2^2 R}{2} - (T_S - T_W)/\theta \quad (4)$$

As previously described, each of these elements is treated as a purely capacitive element. This means that the change in their temperature can be related to their net heat intake and their thermal capacitance. That is, $$\dot{T} = \alpha q \quad (5)$$

As previously described, one choice of state variables for this system is the set of $T_E$, $T_W$, $T_S$. Inputs are $I_1$, $I_2$ and a disturbance to the system is $T_\infty$. Thus, the nonlinear state equations for the system are as follows (as described previously, this is the case for the wire being heated from both sides):

$$\dot{T}_E = \alpha_E \left[ -SI_1 T_E + \frac{I_1^2 R}{2} - (T_E - T_W)/\theta + h(T_\infty - T_E) \right] \quad (6)$$

$$\dot{T}_W = \alpha_W \left[ SI_1 T_E - SI_2 T_S + \frac{(I_1^2 + I_2^2)R}{2} - \frac{(T_W - T_E) + (T_W - T_S)}{\theta} \right]$$

$$\dot{T}_C = \alpha_C \left[ SI_2 T_S + \frac{I_2^2 R}{2} - (T_S - T_W)/\theta \right]$$

The response of the SMA wire to its temperature is also modeled. A commonly used model for shape memory alloy materials is the Preisach Hysteresis model. Briefly, the Preisach Hysteresis model treats the output of the system as the sum of an infinite number of infinitesimal discrete operators.

The system of the present invention is challenging to control. Although the nature of the parameters has been modeled, there is still a great deal of uncertainty in the system. Most of this uncertainty lies in the SMA wire. The displacement response of a shape memory alloy wire to a given temperature depends greatly on the stress induced on the wire. This means that the distribution of a person's weight on the seat will affect the response of the system.

Because of such issues, it is difficult to accurately predict exactly how the system will respond to a given input. Due to differences in weight distribution and slight variations in alignment, several actuators that were manufactured in the same manner might respond differently to identical inputs.

This problem requires a control algorithm that is able to learn the parameters of the system and adjust its response accordingly. In addition, it also constantly readjusts this response as various disturbances, such as a changing external temperature, or a new passenger with a different weight, are introduced. In the present invention, a control algorithm such as the Iterative Learning Control is used. Iterative Learning Control (ILC) is a control algorithm developed in S. Arimoto, S. Kawamura, and F. Miyazaki. Bettering Operation of Robots by Learning. Journal of Robotic Systems. Vol. 1, pp 123-140, 194., incorporated herein by reference, for the purpose of control of a system with unknown parameters. For the purpose of the present invention, ILC., not repetitive control (a related methodology) is utilized. The desired trajectory of the system must be known. In addition, convergence of this algorithm has only been shown for a certain class of systems. Hysteretic systems, such as the shape memory alloy wire (P. Gray. 1960, *The Dynamic Behaviour of Thermoelectric Devices*, M.I.T. Press & John Wiley and Sons, New York., incorporated herein by reference) have sufficient properties to belong to this class (K. Leang and S. Devasia. Iterative Feedforward Compensation of Hysteresis in Piezo Positioners. Proceedings of the 42$^{nd}$ IEEE Conference on Decision and Control. Maui, Jawaii USA, December 2003., incorporated herein by reference).

Figure 38:
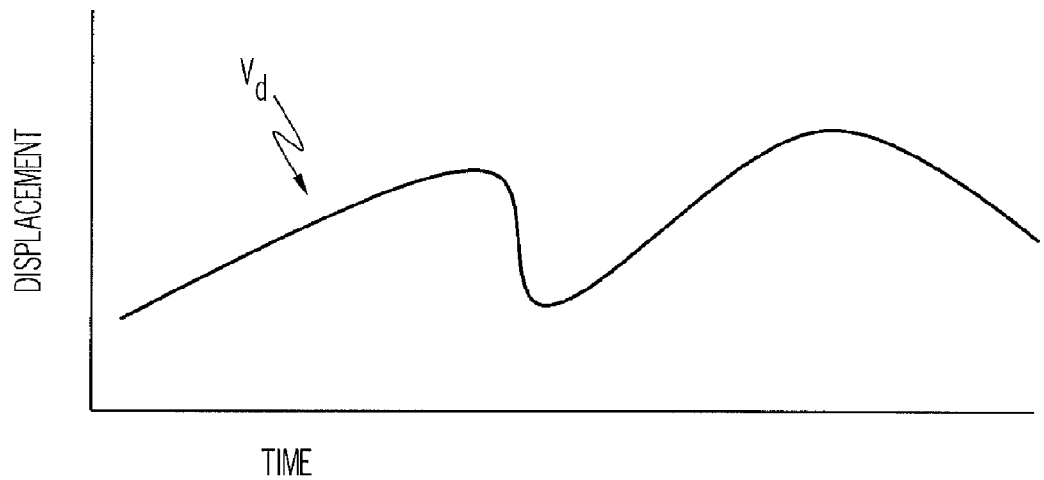
FIG. 38 is a graph illustrating a desired trajectory in accordance with the present invention.

FIG. 38 is a graph illustrating a desired trajectory in accordance with the present invention. $v(t)=F\{u(t)\}$ where the system dynamics F{ } are unknown and u(t) is the input. The desired displacement trajectory is shown as $v_d$. The input is temperature and the output is displacement.

The $u_d(t)$ is found such that $v_{d(t)=F\{u_d}(t)\}$. The present invention starts with an initial arbitrary estimate or "guess," for example $u_0(t)$. The resulting output $v_0(t)=F\{u_0(t)\}$ will likely have some error.

Figure 39:
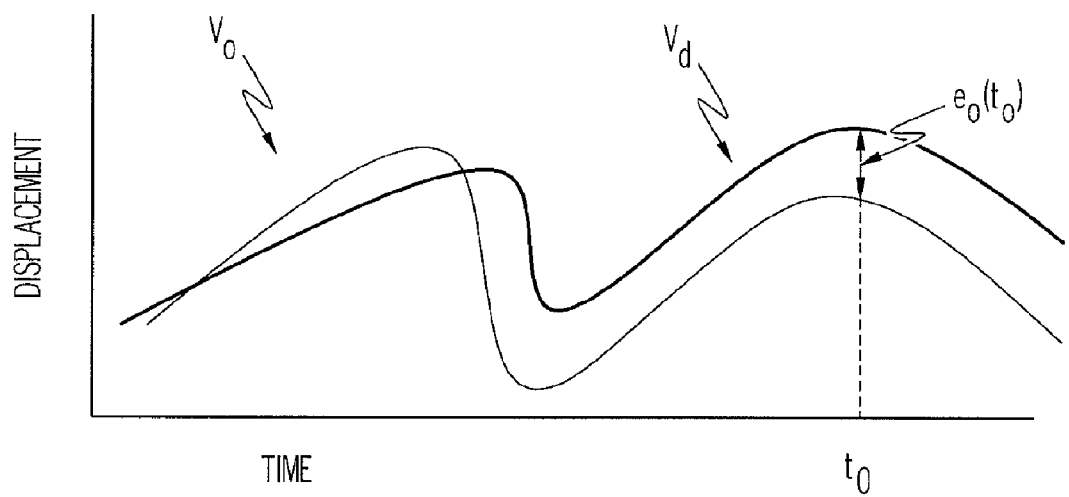
FIG. 39 is a graph illustrating a desired trajectory compared to some actual trajectory for $0^{th}$ iteration, in accordance with the present invention.

This initial error function is called $e_0(t)$. FIG. 39 is a graph illustrating a desired trajectory compared to some actual trajectory for 0$^{th}$ iteration, in accordance with the present invention. ILC uses $e_0(t)$ in order to get a better estimate of $u_d(t)$. This next guess is called $u_1(t)$. The resulting output will be $y_1(t)=H\{u_1(t)\}$. Note that the subscript of each function represents how many trials have been completed. That is, the guess $u_k(t)$ is the k$^{th}$ attempt to reach $u_d(t)$. The goal is to chose an updating law, namely, $$u_{k+1}(t)=u_k(t)+\rho[v_d(t)-v_k(t)]$$

such that, as k→∞, $u_k(t)$→$u_d(t)$.

ILC is particularly useful to this application because during a massaging motion, the coordination among the various actuators is important. In order to create a wave-like motion on the surface of the seat, the actuators need to operate sequentially, and should be appropriately timed. If a person's weight is unevenly distributed across the seat, the varying stresses induced on each actuator will cause its displacement profile to differ from that of its neighbors. ILC., however, allows for each element to learn how to coordinate its actuation accurately despite unknown conditions and external disturbances. Due to the unique properties of the system in question, a specialized ILC algorithm may also be an appropriate choice.

Additionally, an alternative theory is for the control of systems with an ensemble of similar actuators that have phase shifted desired outputs. Because of the traits of such a system, it is possible for each actuator to gain a great deal of information about the disturbances present by looking not only at its own input-output relationship, but also at that of its neighbors. This control methodology can be used in the present invention.

As described previously, the actuation of the system is made possible through the use of peltier TEDs. These peltier TEDs deliver heat to or remove heat from the SMA wires in order to control their temperature, and thus their displacement. In addition to the actuation requirement, the active car seat must also be able to quickly deliver or remove heat from the seat surface. The architecture of the present invention includes a bilayer of peltier effect TEDs. In the present invention, the temperature control of the seat is performed using the same TEDs that innervate onto the SMA wires. The peltier TEDs are arranged in a bilayer in order to get more effective control in extreme temperature environments. The surface of the peltier TEDs is in direct contact with the fabric of the seat surface. This allows for direct, local temperature control. It is because of this direct contact with the seat surface that dramatic temperature change even in extreme environments is achieved.

Delivering heat to a seat surface can be accomplished by a resistive heater. Removing heat, however, is more difficult. On a warm day, the interior of a car can reach temperatures about 50° C. Cooling a seat surface in these conditions is especially difficult because heat must be dumped to this high temperature to protect against thermal runaway.

Figure 40:
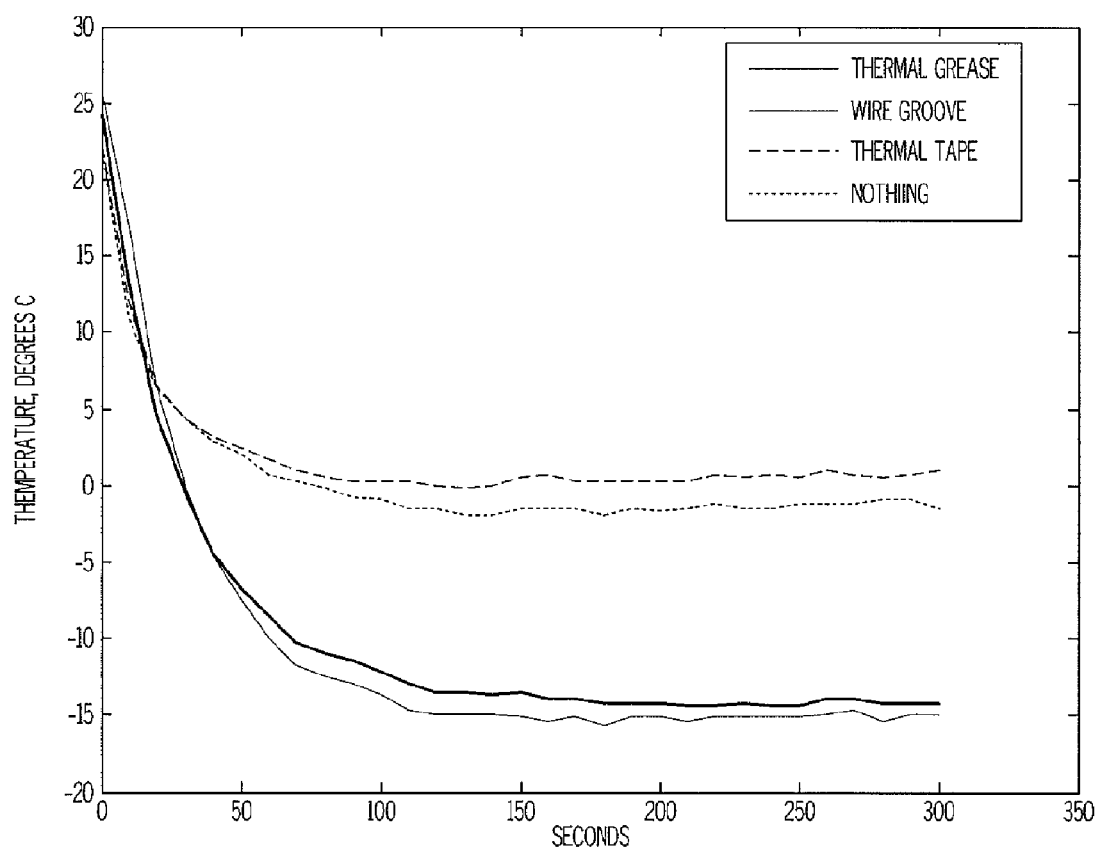
FIG. 40 is a graph illustrating a comparison of thermal resistances.

One of the difficulties inherit in this cooling process is the interface between the peltier TEDs. The width of the SMA wire causes an air gap between the surfaces of the TEDs. This interface has a significant thermal resistance that impedes the performance of the setup. Several possible solutions to this problem are possible. A small slit can be cut into the ceramic surface of the peltier TED. The SMA wire is placed into this slit, allowing the faces of the TEDs to sit flush, greatly reducing thermal resistance. In another case, a liberal application of thermal grease can be used. Finally, thermal tape can be placed on the surface of each element. The effects of these solutions can be seen in FIG. 40. FIG. 40 is a graph illustrating a comparison of thermal resistances.

The cooling ability of the TED with the slit was approximately equivalent to the TED with thermal grease. Machining a small slit into a hard ceramic surface is extremely difficult and expensive. For this reason, thermal grease is the best method to reduce thermal resistance between the peltier TEDs.

Figure 41:
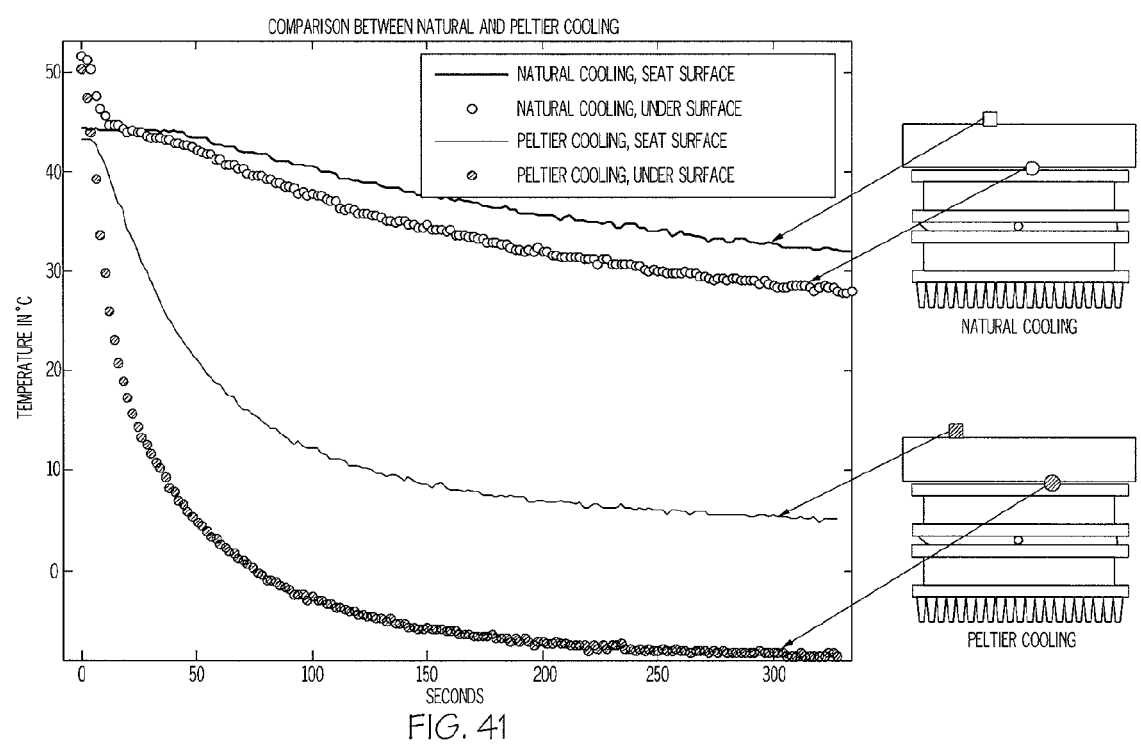
FIG. 41 is a graph illustrating a comparison between natural and peltier cooling.

FIG. 41 is a graph illustrating a comparison between natural and peltier cooling. FIG. 41 shows the cooling ability of the bilayer of peltier TEDs in a hot environment compared to natural convective cooling. In FIG. 41 a prototype assembly was convectively heated to temperatures around 50° C. It was then cooled using two different methods. In the first method of FIG. 41, it was allowed to cool naturally, in the manner that a car seat would respond to the opening of a car door. In the second method, the peltier TEDs were used to speed up the cooling. The effect of the TEDs is shown in FIG. 41. FIG. 41 shows the dramatic ability of the TEDs to regulate the seat temperature even in harsh environments.

The seat fabric offers some significant thermal resistance which impedes the TED's ability to control the temperature of the seat surface. This thermal resistance has been greatly reduced due to the use of specialized fabrics produced by Kolon Glotech Inc. These fabrics allow for good thermal conduction while still being flexible enough to allow the actuating levers to move adequately.

The peltier TEDs dissipate a good deal of power while operating. This power is released in the form of heat and needs to be removed in some way. A large heat sink attached to a fan quickly removes this heat from each group of peltiers even with very small ducting space.

The design of an active car seat has been presented. The architecture of the device, which integrates thermoelectric devices with shape memory alloy actuators, has been described. The thermoelectric devices serve a dual purpose: temperature control of the seat surface and activation of the actuators. The actuators are organized in a manner to allow the formation of a surface wave along the length of the seat, which is the desired massaging motion. The system has been modeled to the extent that an appropriate control methodology can be chosen.

While this invention has been particularly shown and described with references to preferred embodiments thereof, it will be understood by those skilled in the art that various changes in form and details may be made herein without departing from the spirit and scope of the invention as defined in the appended claims.

The invention claimed is:

1. An apparatus, comprising:
   a thermally innervated material actuator, the thermally innervated material actuator changing shape upon application of a temperature change to the thermally innervated material actuator;
   a bilayer of thermoelectric devices having first and second thermoelectric devices coupled to the thermally innervated material actuator such that the thermally innervated material actuator is between the first and second thermoelectric devices, the first and second thermoelectric devices applying the temperature change to the thermally innervated material actuator.

2. The apparatus of claim 1, wherein the first and second thermoelectric devices are peltier effect thermoelectric devices.

3. The apparatus of claim 1, wherein the apparatus comprises a plurality of thermally innervated material actuators used in parallel.

4. The apparatus of claim 1, wherein the apparatus comprises a single thermally innervated material actuator.

5. The apparatus of claim 1, wherein the thermally innervated material actuator is a shape memory alloy wire.

6. The apparatus of claim 1, wherein actuation of the thermally innervated material actuator is translated into a desired motion.

7. The apparatus of claim 6, wherein the actuation is translated through a pulley into the desired motion.

8. The apparatus of claim 7, wherein the actuation is further translated through a lever into the desired motion.

9. The apparatus of claim 6, wherein the desired motion is a massaging motion.

10. The apparatus of claim 6, wherein the desired motion is a propagating wave motion.

11. The apparatus of claim 6, wherein the desired motion changes pressure on thighs of a person sitting on a seat having the apparatus.

12. The apparatus of claim 1, wherein the bilayer of thermoelectric devices are in direct contact with a seat.

13. The apparatus of claim 1, wherein a plurality of bilayers of thermoelectric devices are arranged in a bilayer architecture such that a large temperature differential is provided.

14. The apparatus of claim 1, wherein the first and second thermoelectric devices perform temperature control of a seat.

15. The apparatus of claim 1, wherein the apparatus is part of a seat.

16. An apparatus comprising:
a plurality of actuation devices, each actuation device comprising:
a thermally innervated material actuator, the thermally innervated material actuator changing shape upon application of a temperature change to the thermally innervated material actuator;
first and second thermoelectric devices coupled to the thermally innervated material actuator such that the thermally innervated material actuator is between the first and second thermoelectric devices, the first and second thermoelectric devices applying the temperature change to the thermally innervated material actuator;
wherein the plurality of actuation devices are arranged to act in a coordinated manner.

17. The apparatus of claim 16, wherein the first and second thermoelectric devices are peltier effect thermoelectric devices.

18. The apparatus of claim 16, wherein each actuation device comprises a plurality of thermally innervated material actuators used in parallel.

19. The apparatus of claim 16, wherein each actuation device comprises a single thermally innervated material actuator.

20. The 9 apparatus of claim 16, wherein the thermally innervated material actuator is a shape memory alloy wire.

21. The apparatus of claim 16, wherein the first and second thermoelectric devices are in direct contact with a seat.

22. The apparatus of claim 16, wherein the coordinated manner comprises a propagating wave motion.

23. The apparatus of claim 16, wherein the plurality of actuator devices are spaced and arranged in a row along a length of a seat.

24. The apparatus of claim 23, wherein the plurality of actuator devices are tapered towards a rear of the seat.

25. The apparatus of claim 16, wherein an iterative control process maintains a desired surface wave when a stress applied to the actuator devices is varied.

26. The apparatus of claim 16, wherein a plurality of bilayers of thermoelectric devices are arranged in a bilayer architecture such that a large temperature differential is provided.

27. The apparatus of claim 16, wherein the first and second thermoelectric devices perform temperature control of a seat.

28. The apparatus of claim 16, wherein the apparatus is in a seat.

29. An apparatus, comprising:
a thermally innervated material actuator, the thermally innervated material actuator changing shape upon application of a temperature change to the thermally innervated material actuator;
a bilayer of thermoelectric devices having first and second thermoelectric devices coupled to the thermally innervated material actuator such that the thermally innervated material actuator is between the first and second thermoelectric devices, the first and second thermoelectric devices applying the temperature change to the thermally innervated material actuator and the first and second thermoelectric devices performing temperature control.

30. The apparatus of claim 29, wherein the first and second thermoelectric devices are peltier effect thermoelectric devices.

31. The apparatus of claim 29, wherein the apparatus comprises a plurality of thermally innervated material actuators used in parallel.

32. The apparatus of claim 31, wherein the plurality of actuators are arranged to act in a coordinated manner.

33. The apparatus of claim 29, wherein the thermally innervated material actuator is a shape memory alloy wire.

34. The apparatus of claim 29, wherein actuation of the thermally innervated material actuator is translated into a desired motion.

35. The apparatus of claim 29, wherein the apparatus comprises a single thermally innervated material actuator.

36. The apparatus of claim 29, wherein the bilayer of thermoelectric devices are in direct contact with a seat.

37. The apparatus of claim 29, wherein a plurality of bilayers of thermoelectric devices are arranged in a bilayer architecture such that a large temperature differential is provided.

38. The apparatus of claim 29, wherein the apparatus is in a seat.

39. A seat, comprising:
a thermally innervated material actuator, the thermally innervated material actuator changing shape upon application of a temperature change to the thermally innervated material actuator;
a bilayer of thermoelectric devices having first and second thermoelectric devices coupled to the thermally innervated material actuator such that the thermally innervated material actuator is between the first and second thermoelectric devices, the first and second thermoelectric devices applying the temperature change to the thermally innervated material actuator.

40. The seat of claim 39, comprising a plurality of thermally innervated material actuators arranged to act in a coordinated manner.

41. The seat of claim 39, wherein the first and second thermoelectric devices perform temperature control of the seat.

42. The seat of claim 39, wherein the first and second thermoelectric devices are peltier effect thermoelectric devices.

43. The seat of claim 39, wherein the seat comprises a plurality of thermally innervated material actuators used in parallel.

44. The seat of claim 39, wherein the seat comprises a single thermally innervated material actuator.

45. The seat of claim 39, wherein the thermally innervated material actuator is a shape memory alloy wire.

46. The seat of claim 39, wherein actuation of the thermally innervated material actuator is translated into a desired motion.

47. The seat of claim 39, wherein the bilayer of thermoelectric devices are in direct contact with the seat.

48. The seat of claim 39, wherein a plurality of bilayers of thermoelectric devices are arranged in a bilayer architecture such that a large temperature differential is provided.

49. A method, comprising:
providing a thermally innervated material actuator, the thermally innervated material actuator changing shape upon application of a temperature change to the thermally innervated material actuator;
providing a bilayer of thermoelectric devices having first and second thermoelectric devices coupled to the thermally innervated material actuator such that the thermally innervated material actuator is between the first and second thermoelectric devices, the first and second thermoelectric devices applying the temperature change to the thermally innervated material actuator.

50. The method of claim 49, wherein the first and second thermoelectric devices are peltier effect thermoelectric devices.

51. The method of claim 49, wherein the thermally innervated material actuator is a shape memory alloy wire.

52. The method of claim 49, wherein actuation of the thermally innervated material actuator is translated into a desired motion.

53. The method of claim 52, wherein the actuation is translated through a pulley into the desired motion.

54. The method of claim 53, wherein the actuation is further translated through a lever into the desired motion.

55. The method of claim 52, wherein the desired motion changes pressure on thighs of a person sitting on a seat.

56. The method of claim 49, wherein the bilayer of thermoelectric devices are in direct contact with a seat.

57. The method of claim 49, wherein the plurality of actuation devices are arranged to act in a coordinated manner.

58. The method of claim 49, wherein the first and second thermoelectric devices perform temperature control of a seat.

59. A method comprising:
providing a plurality of actuation devices, each actuation device comprising:
a thermally innervated material actuator, the thermally innervated material actuator changing shape upon application of a temperature change to the thermally innervated material actuator;
first and second thermoelectric devices coupled to the thermally innervated material actuator such that the thermally innervated material actuator is between the first and second thermoelectric devices, the first and second thermoelectric devices applying the temperature change to the thermally innervated material actuator;
wherein the plurality of actuation devices are arranged to act in a coordinated manner.

60. The method of claim 59, wherein the first and second thermoelectric devices are peltier effect thermoelectric devices.

61. The method of claim 59, wherein the thermally innervated material actuator is a shape memory alloy wire.

62. The method of claim 59, wherein the first and second thermoelectric devices are in direct contact with a seat.

63. The method of claim 59, wherein the coordinated manner is a propagating wave motion.

64. The method of claim 59, wherein an iterative control algorithm maintains a desired surface wave when a stress applied to the actuator devices is varied.

65. The method of claim 59, wherein the first and second thermoelectric devices perform temperature control of a seat.

66. A method, comprising:
providing a thermally innervated material actuator, the thermally innervated material actuator changing shape upon application of a temperature change to the thermally innervated material actuator;
providing a bilayer of thermoelectric devices having first and second thermoelectric devices coupled to the thermally innervated material actuator such that the thermally innervated material actuator is between the first and second thermoelectric devices, the first and second thermoelectric devices applying the temperature change to the thermally innervated material actuator and the first and second thermoelectric devices performing temperature control of a seat including the first and second thermoelectric devices.

67. The method of claim 66, wherein the first and second thermoelectric devices are peltier effect thermoelectric devices.

68. The method of claim 66, wherein the thermally innervated material actuator is a shape memory alloy wire.

69. The method of claim 66, wherein actuation of the thermally innervated material actuator is translated into a desired motion.

70. The method of claim 69, wherein the desired motion changes pressure on thighs of a person sitting on a seat.

71. The method of claim 66, wherein the bilayer of thermoelectric devices are in direct contact with a seat.

72. The method of claim 66, wherein the plurality of actuation devices are arranged to act in a coordinated manner.

73. A method of providing controlled motion to a seat, comprising:
providing a thermally innervated material actuator, the thermally innervated material actuator changing shape upon application of a temperature change to the thermally innervated material actuator;
providing a bilayer of thermoelectric devices having first and second thermoelectric devices coupled to the thermally innervated material actuator such that the thermally innervated material actuator is between the first and second thermoelectric devices, the first and second thermoelectric devices applying the temperature change to the thermally innervated material actuator.

74. The method of claim 73, wherein the plurality of actuation devices are arranged to act in a coordinated manner.

75. The method of claim 73, wherein the first and second thermoelectric devices perform temperature control of the seat.

76. The method of claim 73, wherein the first and second thermoelectric devices are peltier effect thermoelectric devices.

77. The method of claim 73, wherein the thermally innervated material actuator is a shape memory alloy wire.

78. The method of claim 73, wherein actuation of the thermally innervated material actuator is translated into a desired motion.

79. The method of claim 73, wherein the bilayer of thermoelectric devices are in direct contact with a seat.

* * * * *

UNITED STATES PATENT AND TRADEMARK OFFICE
CERTIFICATE OF CORRECTION

PATENT NO. : 7,731,279 B2  Page 1 of 1
APPLICATION NO. : 11/557779
DATED : June 8, 2010
INVENTOR(S) : H. Harry Asada et al.

It is certified that error appears in the above-identified patent and that said Letters Patent is hereby corrected as shown below:

Column 29, line 32, delete "9" between "The" and "apparatus"

Signed and Sealed this

Thirtieth Day of November, 2010

David J. Kappos
*Director of the United States Patent and Trademark Office*